United States Patent
Dhawan et al.

(10) Patent No.: US 10,460,196 B2
(45) Date of Patent: Oct. 29, 2019

(54) SALIENT VIDEO FRAME ESTABLISHMENT

(71) Applicant: Adobe Inc.

(72) Inventors: Anmol Dhawan, Ghaziabad (IN); Varun Maini, New Delhi (IN); Srinivasa Madhava Phaneen Angara, Noida (IN); Amol Jindal, Patiala (IN)

(73) Assignee: Adobe Inc., San Jose, CA (US)

( * ) Notice: Subject to any disclaimer, the term of this patent is extended or adjusted under 35 U.S.C. 154(b) by 4 days.

(21) Appl. No.: 15/232,533

(22) Filed: Aug. 9, 2016

(65) Prior Publication Data

US 2018/0046879 A1    Feb. 15, 2018

(51) Int. Cl.
*G06K 9/00* (2006.01)
*G06K 9/46* (2006.01)
*G06K 9/62* (2006.01)

(52) U.S. Cl.
CPC ....... *G06K 9/4671* (2013.01); *G06K 9/00751* (2013.01); *G06K 9/623* (2013.01)

(58) Field of Classification Search
CPC ............ G06K 9/4671; G06K 9/00718; G06K 9/00751; G06K 9/623
See application file for complete search history.

(56) References Cited

U.S. PATENT DOCUMENTS

| | | | |
|---|---|---|---|
| 7,184,100 B1* | 2/2007 | Wilf | G11B 27/28 348/700 |
| 8,649,573 B1* | 2/2014 | Darbari | G06K 9/00751 382/118 |
| 9,336,433 B1* | 5/2016 | Ortiz | G06K 9/00228 |
| 9,846,815 B2* | 12/2017 | Karsh | G08B 13/19606 |
| 2003/0068087 A1* | 4/2003 | Wu | G06F 16/739 382/190 |
| 2004/0181747 A1* | 9/2004 | Hull | G06F 3/1204 715/202 |
| 2004/0252194 A1* | 12/2004 | Lin | G08B 13/19645 348/169 |
| 2007/0147504 A1* | 6/2007 | Wang | G06F 16/7864 375/240.13 |
| 2008/0304808 A1* | 12/2008 | Newell | G11B 27/034 386/278 |
| 2009/0079840 A1* | 3/2009 | Gandhi | G11B 27/28 348/222.1 |

(Continued)

*Primary Examiner* — Sean T Motsinger
(74) *Attorney, Agent, or Firm* — SBMC

(57) ABSTRACT

Salient video frame establishment is described. In one or more example embodiments, salient frames of a video are established based on multiple photos. An image processing module is capable of analyzing both video frames and photos, both of which may include entities, such as faces or objects. Frames of a video are decoded and analyzed in terms of attributes of the video. Attributes include, for example, scene boundaries, facial expressions, brightness levels, and focus levels. From the video frames, the image processing module determines candidate frames based on the attributes. The image processing module analyzes multiple photos to ascertain multiple relevant entities based on the presence of entities in the multiple photos. Relevancy of an entity can depend, for instance, on a number of occurrences. The image processing module establishes multiple salient frames from the candidate frames based on the multiple relevant entities. Salient frames can be displayed.

20 Claims, 13 Drawing Sheets

(56) References Cited

U.S. PATENT DOCUMENTS

| | | | | |
|---|---|---|---|---|
| 2012/0020648 A1* | 1/2012 | Yamaji | ............... | G11B 27/034 |
| | | | | 386/278 |
| 2012/0201506 A1* | 8/2012 | Takagi | ............... | G11B 27/105 |
| | | | | 386/230 |
| 2012/0263433 A1* | 10/2012 | Mei | ................... | G06Q 30/0276 |
| | | | | 386/241 |
| 2014/0186004 A1* | 7/2014 | Hamer | ............. | H04N 21/21805 |
| | | | | 386/223 |
| 2015/0262000 A1* | 9/2015 | Huo | ................. | G06K 9/00718 |
| | | | | 382/199 |
| 2015/0317511 A1* | 11/2015 | Li | ..................... | G06K 9/00288 |
| | | | | 382/118 |
| 2016/0026638 A1* | 1/2016 | Jin | ........................ | G11B 27/28 |
| | | | | 345/418 |
| 2016/0247024 A1* | 8/2016 | Loui | .................. | G06F 16/784 |
| 2016/0366334 A1* | 12/2016 | Kim | ................... | H04N 5/23219 |
| 2017/0032178 A1* | 2/2017 | Henry | ................... | G06T 11/60 |
| 2017/0091558 A1* | 3/2017 | Smolic | .............. | G06K 9/00711 |
| 2017/0323466 A1* | 11/2017 | Eronen | ............... | G11B 27/034 |
| 2017/0330038 A1* | 11/2017 | Chan | ................. | G06K 9/00268 |
| 2017/0357877 A1* | 12/2017 | Lin | ................... | G06K 9/00228 |

* cited by examiner

SALIENT VIDEO FRAME ESTABLISHMENT

BACKGROUND

In previous decades, recording a video entailed carrying a separate, relatively large and bulky device called a video camera recorder, or camcorder. In the 1980's and into the 1990's, these camcorders were so large and heavy that a person often used a shoulder to support the camcorder while filming a video. By the late 1990's and into the 2000's, camcorders became increasingly smaller and lighter. A camcorder from this era eventually weighed less than a few pounds and was supported with one hand while filming In each of these previous decades, video recording was usually reserved for special events and long recording times. The videos were recorded to tape, followed by optical discs, and then to magnetic disks. Such long-form personal videos were typically "shared" as part of an hours-long social event by inviting people into one's home and screening the video on a television.

By around 2010, a new type of video camera recording device, or video camera, became popular: the smart phone. The quality of video recording on smart phones has improved such that smart phone videos now rival those recorded by separate camcorders from just the previous decade. Many people carry a smart phone with them at all times, so a video camera is literally always at hand Thus, a person with a smart phone can record high quality video using just one hand and with only a moment's notice. People are therefore recording significantly more videos than in the past. Each smart phone video, however, tends to be shorter than camcorder videos. Smart phone videos are also less likely to be used to memorialize a once-in-a-lifetime occasion like a wedding or graduation. Accordingly, playing smart phone videos as the focal point of a scheduled social event is less common. Nevertheless, people still want to share videos taken by smart phones.

People wish to quickly share special events that have been memorialized in video form using an electronic format that can be distributed to many friends and family members. Thus, smart phone users typically want to distribute videos via email, text, or social media for nearly instantaneous sharing. Unfortunately, sharing videos is difficult. The electronic files of even relatively short videos are large and therefore consume a tremendous amount of bandwidth, which renders electronic transmission problematic. Moreover, even if a video can be transmitted, watching the video takes some amount of time, which may not be available to a recipient given today's busy lifestyle.

Another approach to sharing aspects of an event that is memorialized in video form involves transmitting an image that is intended to be representative of the event. The image is derived from one or more frames of the video. For example, a static collage formed from multiple frames of the video can be produced and then shared via email, text, or social media. A static collage consumes significantly less bandwidth than the video on which it is based. Furthermore, a recipient can view a static collage practically instantaneously. There are two conventional approaches to creating a static collage from a video.

A first conventional approach includes four steps. A video is first decoded into a collection of constituent frames. These constituent frames are presented to an end user. In a second step, the end user is tasked with selecting a number of desired frames from the collection of frames based on composition and visual appeal. Third, the selected frames are provided to a collage creation application. Fourth, the collage creation application creates a static collage based on the frames selected by the end user. The static collage is displayed to the end user, who can elect to share the static collage with others.

This first conventional approach may appear to be quick and easy. Unfortunately, the process is actually quite lengthy and arduous for the end user. A typical video obtained via a smart phone is recorded at 30 frames per second (fps). However, the frames per second for a recording can be higher. With a slow motion capture, for instance, video can be recorded at a rate that is four to eight times higher (e.g., 120-240 fps). Thus, even a relatively short video having a 10-second duration produces at least 300 frames. Consequently, the end user is required to sift through hundreds of frames to select those few frames that the end user wants the collage creation application to include in the static collage. This is a tedious task for the end user. The first conventional approach is therefore impractical for videos having an even moderate duration.

In a second conventional approach, an application, such as the collage creation application, decodes a video to produce a collection of constituent frames as part of the first step. The collage creation application also thins the number of constituent frames to reduce the size of the collection. The surviving frames of the decimated collection are presented to the end user for review and selection. The remaining second through fourth steps are similar to the first conventional approach. Thus, the second conventional approach does reduce the number of frames that the end user has to review in order to select the desired frames for the static collage. For example, just 30 total frames instead of 300 frames may be presented to the end user for a 10 second video.

This second conventional approach can therefore save time for the end user, but other problems arise. The collage creation application decimates the constituent frames by extracting periodic frames from the decoded sequence of frames. The extracted frames are random in relation to the content of the video. The end user is therefore limited to selecting desired frames from a random subset of the entire set of constituent frames of a video. This random subset of frames may be wholly inadequate to represent the event memorialized by the video. For example, the randomly-extracted frames can suffer from bad composition and poor visual appeal, while other constituent frames having a pleasing composition and excellent visual appeal are never presented to the end user. Moreover, the end user may not even see, much less be afforded an opportunity to select from, the constituent frames that include more important aspects of the subject matter of the video.

Thus, conventional approaches to enabling an end user to create a static collage to represent an event that is memorialized by a video have a number of drawbacks. The first conventional approach described above thrusts on the end user the time-consuming and tedious task of reviewing and selecting from hundreds or thousands of constituent frames of a video. Although the second conventional approach partially ameliorates this time-consuming and tedious work, the end user loses the ability to review and select from some of the more desirable frames of the video.

SUMMARY

Salient video frame establishment is described. Techniques and systems described herein enable salient frames to be extracted from a video for presentation to an end user. In one or more example embodiments, an image processing module selectively filters frames of a video using information that is extrinsic to the video to enable a salient frame establishment that is personalized for the end user. The image processing module uses multiple photos having some nexus to a video to generate a saliency indicium. The saliency indicium can be implemented, for example, as a relevant entity indicator that is generated based on relevant entities that are present in the multiple photos. The image processing module uses the saliency indicium to intelligently extract salient frames from the video. The salient frames of the video can be presented to the end user or utilized by an application autonomously.

In some embodiments, an image library includes at least one video having multiple frames and one or more photos. The multiple frames visually represent an event that is memorialized by the video. The multiple photos have a nexus with the video. Examples of a nexus include the photo acquisition being temporally proximate to when the video was recorded and being spatially proximate to where the video was recorded. Based on an analysis of the photos, the image processing module extracts salient frames from the video, with the salient frames having a good visual quality and being pertinent to the event memorialized by the video.

The image processing module includes a relevant entity ascertainment module, a candidate frame determination module, a salient frame establishment module, and a salient frame output module. The relevant entity ascertainment module ascertains multiple relevant entities based on multiple photos. Relevant entities include faces or objects that are present in at least one photo of the multiple photos. The candidate frame determination module determines multiple candidate frames from the multiple frames of the video based on one or more attributes of the video. Attributes include video-level attributes like scene boundaries and frame-level attributes such as focus, brightness, or contrast. The salient frame establishment module establishes multiple salient frames by filtering the multiple candidate frames based on the multiple relevant entities. Thus, salient frames include those candidate frames in which relevant entities appear.

Salient frames can be ranked based on a degree of saliency. For example, a given salient frame in which a particular entity appears can be ranked based on how many times the presence of the corresponding relevant entity occurs across the multiple photos. The salient frame output module controls presentation of the ranked salient frames via a user interface. For instance, the salient frame output module can display the salient frames to an end user for potential inclusion in a static collage that represents the event memorialized by the video. Alternatively, the salient frame output module can use the established salient frames to produce a slide show of the more pertinent moments of a video with a succession of single frames, to produce separate short snippets of the video that represent the memorialized event with excerpted video segments, and so forth. In these manners, salient video frame establishment enables important parts of a video to be identified and intelligently extracted from the video using information that is extrinsic to the video and that is personalized with respect to an end user that filmed the video.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description or in the drawings.

DETAILED DESCRIPTION

Overview

Figure 1:
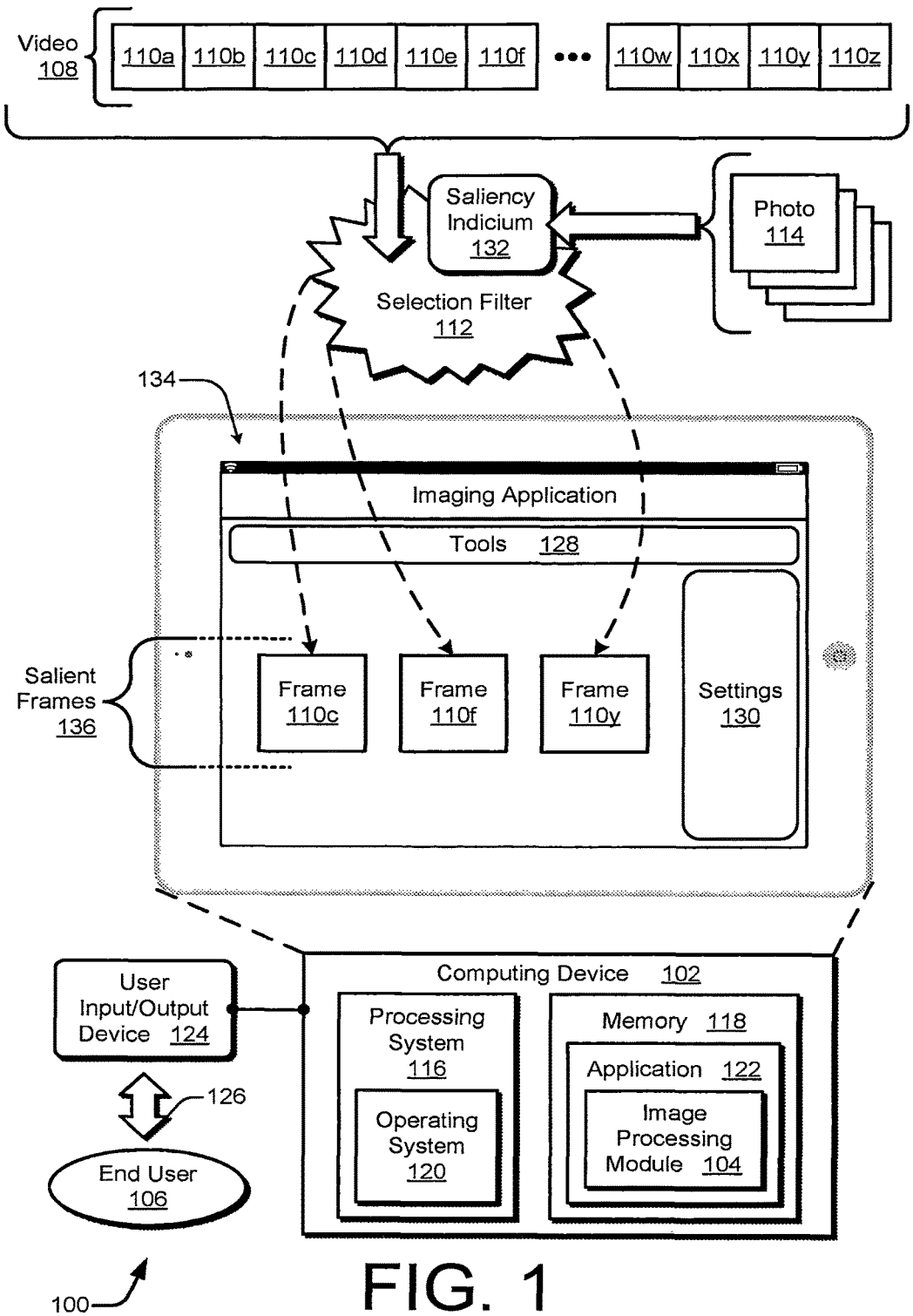
FIG. 1 illustrates an environment for example embodiments that are operable to implement salient video frame establishment with an image processing module.

Salient video frame establishment is described herein. In one or more example embodiments, salient frames are extracted from a video for presentation to an end user. In contrast to conventional approaches in which an end user is overwhelmed by all of the frames of a video or is likely deprived of some desirable frames of a decimated video, salient video frame establishment selectively filters frames of a video using information that is extrinsic to the video to personalize the extraction for the end user. An image processing module uses multiple photos having some nexus to a video, such as a temporal or spatial acquisition proximity of the photos with respect to the video, to generate a saliency indicium. The saliency indicium can be implemented, for example, as a relevant entity indicator that is generated based on relevant entities being present in the multiple photos. The image processing module uses the saliency indicium to intelligently extract salient frames from the video. The salient frames of the video can be presented to the end user or utilized by an application autonomously.

In some embodiments, an image library includes at least one video having multiple frames and one or more photos. The multiple frames represent an event that is memorialized by the video. The multiple photos share a nexus with the video, such as by being temporally proximate to when or spatially proximate to where the video was recorded. The image processing module extracts salient frames from the video based on the photos. The image processing module includes a relevant entity ascertainment module, a candidate frame determination module, a salient frame establishment module, and a salient frame output module. Although described separately and sequentially below, functional operation of one or more of these modules may be combined, or one or more modules may operate in a partially or fully overlapping manner.

In an example operation, the relevant entity ascertainment module ascertains multiple relevant entities based on the multiple photos. Relevant entities include faces or objects that are present in at least one photo of the multiple photos. The candidate frame determination module determines multiple candidate frames from the multiple frames of the video based on one or more attributes of the video. Attributes include video-level attributes like scene boundaries and frame-level attributes such as focus, brightness, and contrast. The salient frame establishment module establishes multiple salient frames by filtering the multiple candidate frames based on the multiple relevant entities. Salient frames include those candidate frames in which relevant entities appear. A given salient frame in which a particular entity appears can be ranked based, for example, on how many times the presence of the corresponding relevant entity occurs across the multiple photos. The salient frame output module controls presentation of the multiple salient frames via a user interface. For instance, the salient frame output module can display the salient frames to an end user for potential inclusion in a static collage that represents the event memorialized by the video.

More specifically, the relevant entity ascertainment module ascertains entities that are present in at least one photo of the multiple photos and are therefore deemed to be relevant to selecting salient frames of the video. The relevant entity ascertainment module includes an entity detection module, an entity recognition module, and an entity relevancy computation module. The entity detection module detects a relevant entity, such as a face of a person. The entity recognition module recognizes the face by assigning an entity identifier to visual characteristics of the detected relevant entity. The entity relevancy computation module computes a relevancy score for the recognized relevant entity. One or more factors may be included in the relevancy computation process. Factors include an occurrence value for a number of times the relevant entity is present across the multiple photos, a proportionality of an area of at least one photo that the relevant entity occupies (e.g., how much space does the relevant entity occupy in a single photo or across the multiple photos), a spatial positioning of the relevant entity (e.g., whether the relevant entity is centered in a photo), some combination thereof, and so forth. The computed relevancy score is associated with the relevant entity.

The candidate frame determination module determines multiple candidate frames that are suitable for consideration as salient frames. The candidate frame determination module includes a scene detection module, a frame quality calculation module, and an entity detection and recognition module. The scene detection module detects scene boundaries between two adjacent frames. At least one frame of the video can be extracted from each different scene for the multiple candidate frames. The frame quality calculation module calculates at least one quality indicator for each frame of the video. The frame quality calculation module associates an image quality indicator or a facial expression quality indicator with each frame. Examples of image quality indicators include focus level, brightness level, and contrast level. A facial expression quality indicator is calculated based on facial expressions such as whether faces are smiling, have open eyes, combinations thereof, and so forth. The entity detection and recognition module detects and recognizes entities in each frame of the video. The detection or recognition techniques applied to the photos by the relevant entity ascertainment module can be applied to the frames of the video by the entity detection and recognition module. The candidate frame determination module uses at least the detected scene boundaries and the calculated frame quality indicators to determine candidate frames from the fames of the video.

The salient frame establishment module filters the candidate frames to select those frames that are more likely to be salient with regard to the event memorialized by the video. The salient frame establishment module includes a candidate frame ranking module and a salient frame selection module. The candidate frame ranking module computes a salient score for each candidate frame. The salient score is computed for a given candidate frame based on multiple factors. Factors can include a facial expression indicator associated with the given candidate frame, at least one image quality indicator associated with the given candidate frame, a respective relevancy score for each individual entity of one or more entities appearing in the given candidate frame, some combination thereof, and so forth. The salient score for a given candidate frame is therefore based on the respective relevancy score associated with each individual entity that appears in the given candidate frame. The candidate frame ranking module ranks the candidate frames based on respective corresponding salient scores. The salient frame selection module selects salient frames from among the candidate frames based on a ranking of the candidate frames that is ordered using the salient scores.

The salient frames form a reduced set of frames as compared to the full set of frames of the decoded video. Instead of randomly decimating the decoded frames, the salient frames are intelligently selected from the full set of decoded frames so as to adequately and accurately represent the event recorded by the video using the reduced set of frames. The salient frame output module controls the output of the salient frames with respect to a user interface. For example, the selected salient frames can be presented to an end user in chronological or ranked order. The image processing module accepts user selection of desired ones of the salient frames. The user-selected salient frames can be used to create a static collage, to create a dynamic collage formed from video clips or Graphics Interchange Format images (GIFs), to generate an abbreviated form of the video having meaningful segments, and so forth.

In these manners, salient video frame establishment facilitates user creation of a static collage by surfacing meaningful frames of a video for consideration for inclusion in the static collage. More generally, salient video frame establishment extracts important frames of a video that can represent the event that was intended to be memorialized by the video using information that is extrinsic to the video to personalize the extraction for the end user. Consequently, systems and techniques for salient video frame establishment can be used to identify or locate those portions of a video that an end user may wish to review for other editing or excerpting purposes.

In the following discussion, after some example terminology is set forth, an example environment is described that may employ the techniques described herein. Example embodiment systems, apparatuses, and techniques are then described, followed by a section explaining example embodiment procedures. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, embodiments presented herein. Some terms are further elucidated using one or more examples.

A "video" refers to a visual recording over time of an experience or an electronic file that embodies the visual recording. The video contains moving elements that are presented to a viewer by displaying in rapid succession a series of frames that form the video. A "frame" refers to a single image of a video having stationary elements. Multiple frames, such as 30 or 60, that are displayed in series represent a second of video. With an example Motion Pictures Expert Group (MPEG) video-encoding implementation, frames can include I-frames, P-frames, or B-frames.

An "attribute of video" refers to some observable, detectable, or measurable aspect of a video. Attributes can pertain to video-level characteristics or frame-level characteristics. An example of a video-level attribute includes a scene boundary or corresponding scenes of a video. Examples of frame-level attributes include an image quality indicator and a facial expression quality indicator. An image quality indicator can reflect a focus level, a brightness level, a contrast level, or some combination thereof for an individual frame. A facial expression quality indicator reflects the facial expression held by faces appearing in a frame, such as smiling or frowning.

A "photo" refers to a visual snapshot that captures an instantaneous moment of an event or an electronic file that embodies the visual snapshot. A photo is also called a photograph or image still shot. Photos can provide a saliency indicium for one or more frames of a video if a nexus exists between the photos and the video. A "nexus" refers to a relationship between when a video is filmed and when photos are taken, where a video is filmed and where photos are taken, some combination thereof, and so forth. Example implementations of a nexus include a temporal threshold or a spatial threshold. A temporal threshold can be a length of a vacation, one week, one day, three hours, and so forth. A spatial threshold can be a city, a theme park, a house, geospatial coordinates coupled with a radius such as 100 meters, and so forth.

An "entity" refers to an item or thing having an individual semantic meaning Examples of entities include faces and objects. An object can be a car, a tree, a house, a dress, and so forth. A person or a body of a person may be considered a face entity or an object entity. A "relevant entity" refers to an entity that is present in at least one photo having a nexus with a video. In other words, an entity that is present in a photo is deemed to be relevant to an event that is memorialized by a related video.

A "relevancy score" refers to a value or indicator representative of how likely an entity, which is present in at least one photo, is to be important to a full or accurate representation of an event. A relevancy score can be computed based on multiple photos with regard to a video having a nexus with the multiple photos. Examples of factors that may affect a relevancy score include a number of occurrences of an entity across a set of photos, a prominence of an entity, a timing of a photo including an entity, and combinations thereof. The prominence of an entity can be inferred from a spatial position of an entity within a photo or a proportional area occupied by an entity within at least one photo. With regard to timing, a photo that is captured while a video is actually being filmed may be inferred to be more relevant than photos captured before or after the video is filmed.

A "candidate frame" refers to a frame that is of sufficient quality so as to be considered for saliency and possible presentation to an end user. Candidate frames of a video are determined based one or more attributes of the video, with the attributes indicative of frame quality or scene representation. Candidate frames can be determined prior to the establishment of salient frames or at least partially during the establishment of the salient frames. Whether a candidate frame is elevated to be a salient frame depends, for example, on a salient score that is associated with each candidate frame.

A "salient score" refers to a value or indicator representative of how likely a frame, such as a candidate frame, is to be capable of adequately and accurately representing an event filmed by a video including the frame. A salient score for a given candidate frame can be computed so as to incorporate attributes of the candidate frame along with a relevancy score for each entity that appears in the candidate frame.

An "establishment" or "establishing" refers to identifying, labeling, elevating, segregating, or characterizing a frame as being of a certain type or kind, such as a salient frame. The establishment of a salient frame may be based, for example, on a salient score. A "salient frame" refers to a frame that is judged to provide at least an adequate level of representation of an event that is intended to be memorialized by a video that includes the frame. Generally, a salient frame is deemed to have good visual quality and to include one or more entities that are germane to the subject matter of the video. Salient frames may be established based on a ranking of frames by corresponding salient scores.

A "control" or "controlling" refers to an ability to locally or remotely cause an operation at a computing device. For example, the presentation of frames of a video can be controlled by an application executing locally, remotely, or some combination thereof. For instance, multiple salient frames may be displayed via a user interface for viewing or selecting by an end user.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment 100 for example embodiments that are operable to implement salient video frame establishment with an image processing module 104. As illustrated, the example environment 100 includes at least one computing device 102, at least one user input/output (I/O) device 124, and at least one end user 106. FIG. 1 also depicts a user interaction between the end user 106 and the user I/O device 124 that produces a user control signal 126. The computing device 102 includes a processing system 116 and a memory 118. The processing system 116 includes an operating system 120. The memory 118 stores an application 122, which includes the image processing module 104. Example implementations for the computing device 102 are described further below in this section. The environment 100 further includes multiple photos 114 and at least one video 108 comprised of multiple frames 110. Frames 110a, 110b, 110c, 110d, 110e, 110f, . . . 110w, 110x, 110y, 110z are explicitly depicted.

As shown on a display screen associated with the computing device 102, the application 122 may be realized as an imaging application, such as a photo modification program or a video editing program. The imaging application processes or displays videos 108 or photos 114 responsive to user input realized as the user control signal 126. For example, the end user 106 can view photos 114 or videos 108, modify the appearance of photos 114, edit a video 108 for content or length, combine aspects of frames 110 or photos 114, create a collage, or some combination thereof. Additionally, the end user 106 can be empowered to view or analyze the video 108 on a frame-by-frame basis.

The computing device 102 provides a user interface 134 that presents output to the end user 106 or accepts input from the end user 106. To enable the end user 106 to manipulate the photos 114 and the videos 108 via the user interface 134, the imaging application provides a number of tools 128. Examples of tools 128 include a selection tool, a contrast tool, a resizing or cropping tool, and a collage creation tool. To enable the end user 106 to easily see a current state of the video 108 or the photos 114 or how a tool will affect or has affected the video or photos, the imaging application displays a number of settings 130. Examples of settings 130 include a color palette, a selected font, an active collage layout, a video time index, a set of options for a currently-selected tool of the tools 128, and a zoom level setting, such as a slider or an adjustable percentage indication. Although shown in the context of a device that enables touch-screen interaction, the tools 128, the settings 130, etc. of the imaging application can alternatively be utilized via mouse, touchpad, voice interaction, or some combination thereof In an example operation, the image processing module 104 implements a selection filter 112 with respect to the frames 110 of the video 108 based on the photos 114. The video 108 and the photos 114 are stored in a memory. This memory may comprise the memory 118, a remote memory, a distributed memory, some combination thereof, and so forth. The selection filter 112 filters out some frames 110 by selecting other frames 110 based on a saliency indicium 132. The image processing module 104 generates the saliency indicium 132 based on the photos 114. The saliency indicium 132 provides at least one indication of which frames 110 are likely to be considered relatively more important by a person that took the video 108 and the photos 114, more desirable to the end user 106, more capable of representing an event that is intended to be memorialized by the video 108, some combination thereof, and so forth. Based on the saliency indicium 132, the image processing module 104 establishes salient frames 136. The salient frames 136 are presented (e.g., displayed) on the user interface 134 of the computing device 102. For instance, frames 110c, 110f, and 110y are selected as the salient frames 136 and presented to the end user 106 via the user interface 134. The image processing module 104 can, however, establish more or fewer salient frames 136.

The computing device 102 can be implemented as any suitable type of computing device. Examples of end-user implementations for the computing device 102 include a desktop computer, a laptop or notebook computer, a mobile device (e.g., assuming a handheld configuration such as a mobile phone, a phablet, or a tablet—which is depicted in FIG. 1), a mobile device coupled to a separate screen, an entertainment appliance such as a smart television, a game console, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 116, an example of a computer-readable storage medium illustrated as memory 118, and so forth. Other hardware components are also contemplated as described herein with reference to FIG. 12. The processing system 116 is representative of functionality to perform operations through execution of instructions stored in the memory 118. Although illustrated as two separate components, functionality of the processing system 116 and the memory 118 may be combined into one component (e.g., on an application specific integrated circuit (ASIC) or as instructions are loaded from the memory onto a processor) or may be further divided into a greater number of components. Examples of a user I/O device 124 include a keyboard, a mouse, a touchpad, a touch screen, a microphone, a camera, a display device such as a screen or projector, a speaker, or some combination thereof. The user I/O device 124 may be separate from or integrated with the computing device 102. The computing device 102 is further illustrated as including an operating system 120. The operating system 120 is configured to abstract underlying hardware functionality of the computing device 102 to the application 122 that is executable on the computing device 102.

In example implementations, the image processing module 104 is located at or executing on the computing device 102, such as by being part of the application 122 or the operating system 120. The image processing module 104 represents functionality to implement schemes and techniques for salient video frame establishment as described herein. The image processing module 104 can be implemented as at least part of a software package that executes on and specially configures one or more processors, which processors may physically realize the processing system 116; as a hardware apparatus, which may be realized as an ASIC or as the computing device 102; or using a combination of software, hardware, firmware, or fixed logic circuitry; with some combination thereof; and so forth. As described herein with reference to FIG. 12, the image processing module 104 may be fully or partially implemented as a web or cloud-based image-oriented service.

Systems and Techniques

Figure 2A:
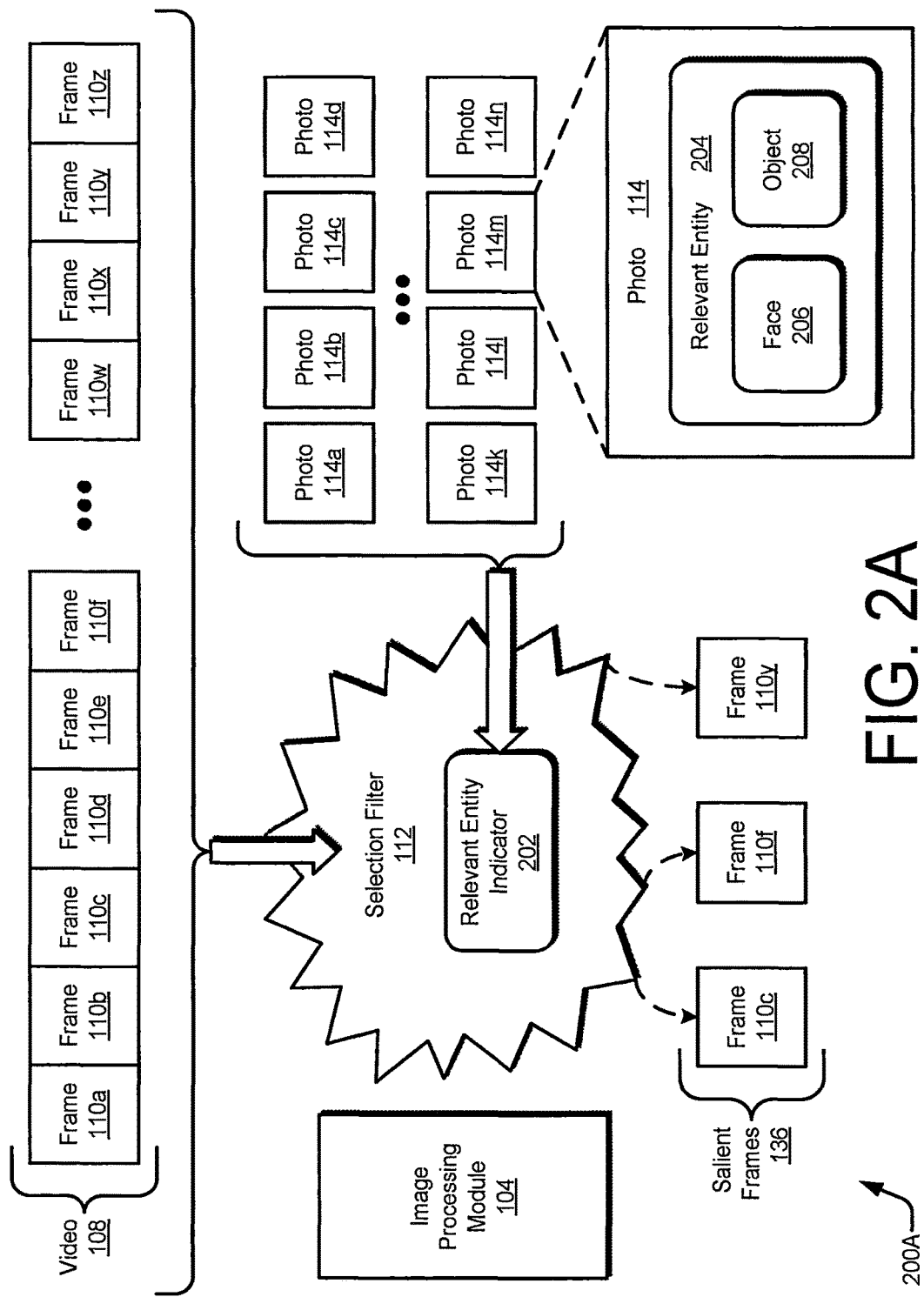
FIG. 2A illustrates at a relatively high level an example scheme for establishing salient frames of a video based on a relevant entity indicator that is derived from multiple photos.

FIG. 2A illustrates at a relatively high level an example scheme 200A for establishing salient frames 136 of a video 108 based on a relevant entity indicator 202 that is derived from multiple photos 114. The video 108 is shown to include frames 110a, 110b, 110c, 110d, 110e, 110f, . . . 110w, 110x, 110y, 110z, with the variable "z" representing any integer number. The image processing module 104 implements a selection filter 112 to filter the frames 110 of the video 108 to select the salient frames 136. Salient frames 136 include, for instance, the frame 110c, the frame 110f, and the frame 110y. However, the salient frames 136 of the video 108 may number more or fewer than three frames. The selection filter 112 filters frames 110 of the video 108 based on the relevant entity indicator 202. The relevant entity indicator 202 is an example implementation of the saliency indicium 132 of FIG. 1.

The image processing module 104 generates the relevant entity indicator 202 based on multiple photos 114. Photos 114a, 114b, 114c, 114d, . . . 114k, 114l, 114m, and 114n are explicitly shown, with the variable "n" representing any integer number. Each photo 114 may depict one or more entities. Because entities that are present in at least one photo 114 are deemed to be relevant for frame selection by the selection filter 112, each such entity is called a relevant entity 204 herein. Examples of a relevant entity 204 include a face 206, an object 208, and so forth. An overall person or a person's body may be categorized as a face 206 or an object 208. In operation, the image processing module 104 ascertains at least one relevant entity 204 that is present in one or more photos 114. The relevant entity indicator 202 is derived from one or more such ascertained relevant entities 204.

Figure 2B:
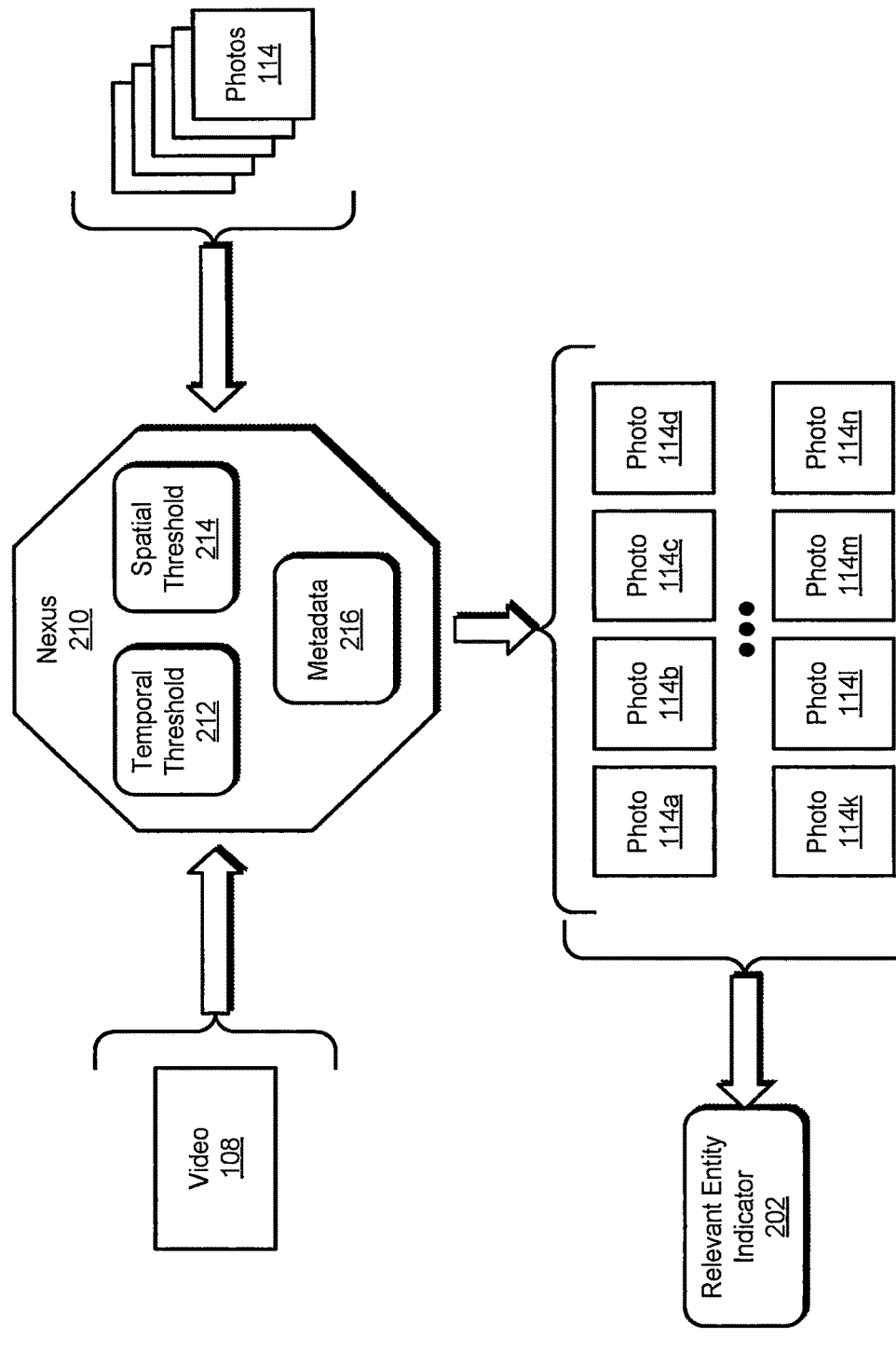
FIG. 2B is a schematic diagram illustrating a nexus between a video and multiple photos.

FIG. 2B is a schematic diagram 200B illustrating a nexus 210 between a video 108 and multiple photos 114. The nexus 210 is indicative of which photos 114 are to be used to generate the relevant entity indicator 202. In an example implementation, the photos 114 that are stored together with the video 108 within an individual's image library, within a family's shared image library, within a group of friend's shared or connected image library, or some combination thereof can be identified and used to ascertain relevant entities 204 (e.g., of FIG. 2). Thus, an image library can provide the nexus 210. Additionally, a social media stream can provide the nexus 210.

However, the nexus 210 between the video 108 and the photos 114 can be implemented in alternative manners. Example alternative implementations for the nexus 210 include at least one temporal threshold 212, at least one spatial threshold 214, some metadata 216, or some combination thereof. The temporal threshold 212 represents a maximum time period difference between when the video 108 is recorded and when a photo 114 is taken. A recording time for the video 108 is associated with the video and can correspond to a start time for the video 108, an end time for the video 108, a midpoint time of the video 108, some combination thereof, and so forth. Examples of the temporal threshold 212 include a week, a day, 3 hours, 30 minutes, and so forth.

The spatial threshold 214 represents a maximum distance between where the video 108 is recorded and where a photo 114 is taken. A geospatial position, such as at least one global positioning system (GPS) coordinate, can be associated with each video 108 and each photo 114. Examples of the spatial threshold 214 include 50 meters, 2 miles, a city or neighborhood, 15 seconds of latitude, or some combination thereof. The metadata 216 represents information, including a time or a location, that is automatically or manually associated with the video 108 or a photo 114. Another example of metadata 216 includes one or more words that are tagged to the video 108 or a photo 114. For instance, if "Pat's Birthday Party" or "Jacob and Maya" is tagged to both the video 108 and multiple photos 114, this tagging serves as a nexus 210 to support using the photos 114 that are so tagged. The identified photos 114 are used to ascertain multiple relevant entities 204 that are then used to generate the relevant entity indicator 202, which is to be applied to the video 108 as part of the selection filter 112. Although described individually above, one or more indicators of a nexus 210 may be used jointly or in combination to identify photos 114 having content that is pertinent to a video 108.

Figure 3:
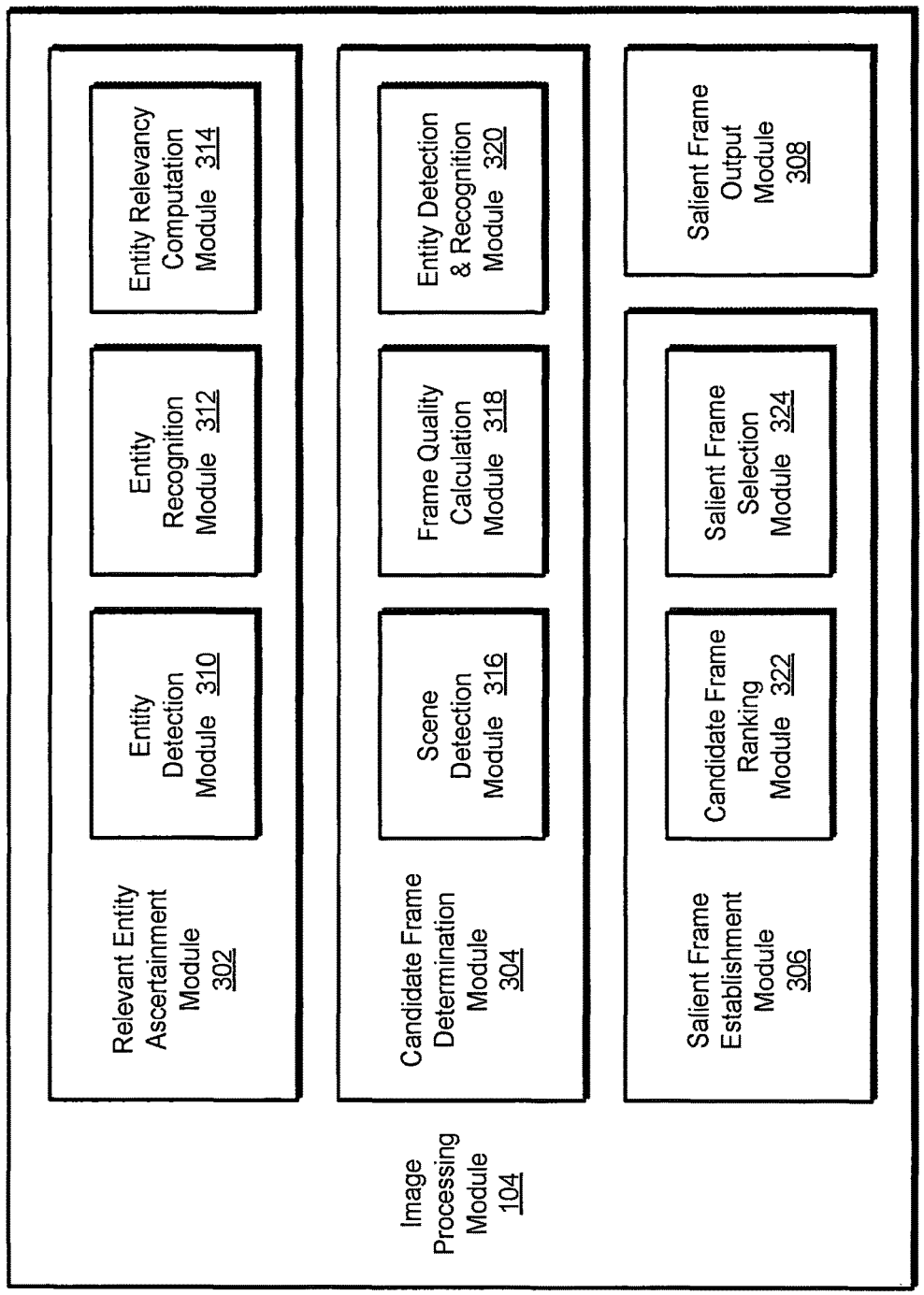
FIG. 3 is an example of an image processing module including a relevant entity ascertainment module, a candidate frame determination module, and a salient frame establishment module.

FIG. 3 is an example of an image processing module 104 including a relevant entity ascertainment module 302, a candidate frame determination module 304, and a salient frame establishment module 306. The image processing module 104 also includes a salient frame output module 308. The image processing module 104 establishes salient frames 136 of a video 108 based on relevant entities 204 derived from multiple photos 114, which establishment is described below with reference to FIG. 4.

The relevant entity ascertainment module 302 ascertains multiple relevant entities 204 based on the multiple photos 114. The relevant entity ascertainment module 302 includes an entity detection module 310, an entity recognition module 312, and an entity relevancy computation module 314. Example operational aspects of the relevant entity ascertainment module 302 are described below with reference to FIG. 5.

The candidate frame determination module 304 determines multiple candidate frames from the multiple frames 110 of the video 108 based on one or more attributes of the video 108. The candidate frame determination module 304 includes a scene detection module 316, a frame quality calculation module 318, and an entity detection and recognition module 320. Example operational aspects of the candidate frame determination module 304 are described below with reference to FIG. 6.

The salient frame establishment module 306 establishes multiple salient frames 136 by filtering the determined multiple candidate frames based on the ascertained multiple relevant entities 204. The salient frame establishment module 306 includes a candidate frame ranking module 322 and a salient frame selection module 324. Example operational aspects of the salient frame establishment module 306 are described below with reference to FIG. 7.

The salient frame output module 308 controls presentation of the multiple salient frames 136 via a user interface 134. Example operational aspects of the salient frame output module 308 are described below with reference to FIGS. 8 and 9 in the context of a birthday party event scenario.

Figure 4:
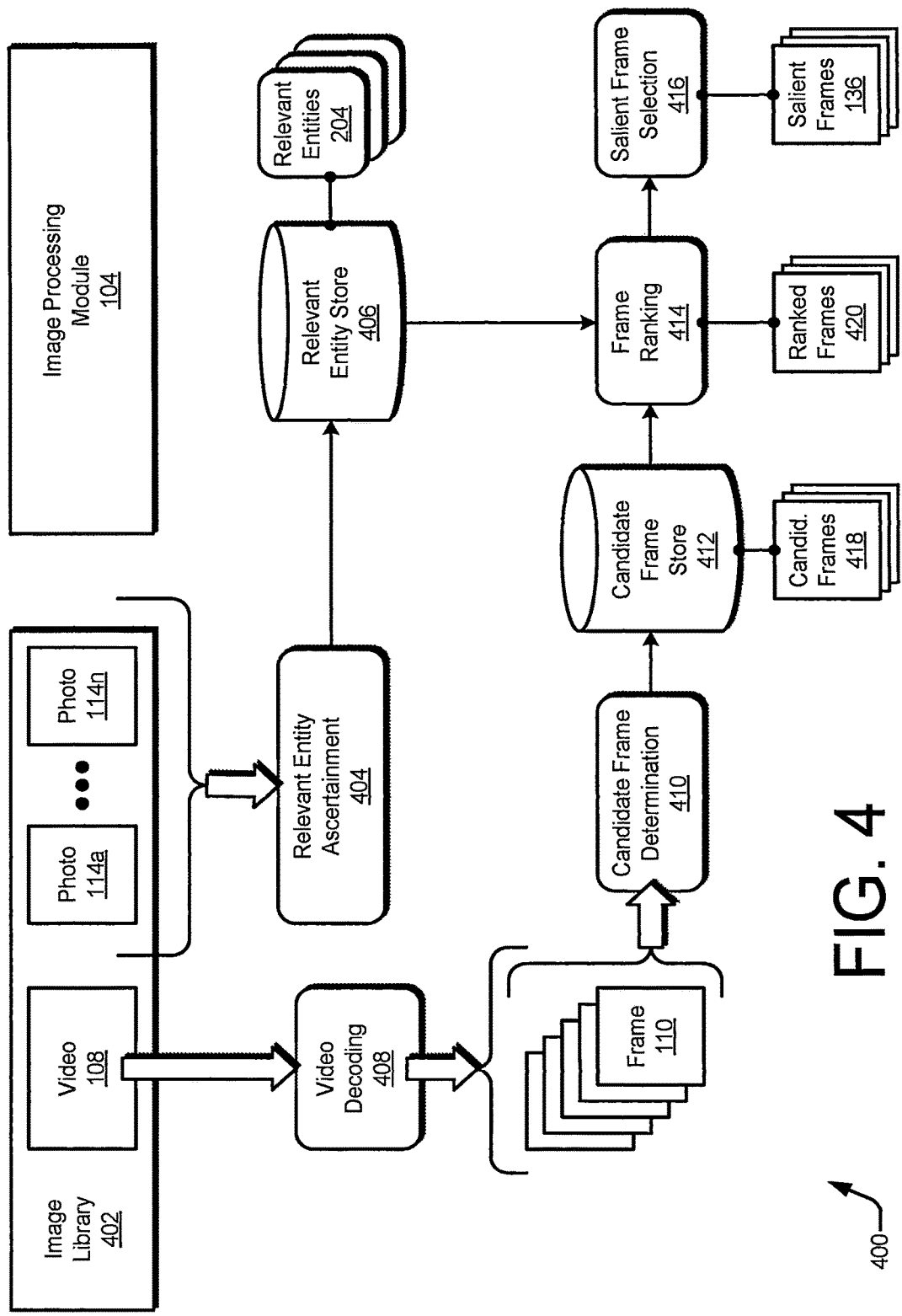
FIG. 4 illustrates at a relatively low level an example scheme for establishing salient frames of a video based on relevant entities derived from multiple photos.

FIG. 4 illustrates at a relatively low level an example scheme 400 for establishing salient frames 136 of a video 108 based on relevant entities 204 derived from multiple photos 114. The image processing module 104 performs the operations depicted by the scheme 400 with reference to an image library 402. The image library 402 stores the video 108 and multiple photos 114a ... 114n. The image library 402 may be located at, for example, a mobile phone or a cloud repository. The image processing module 104 analyzes the multiple photos 114a ... 114n to perform a relevant entity ascertainment 404. The ascertained relevant entities 204 are retained at a relevant entity store 406.

The image processing module 104 performs a video decoding 408 to isolate the individual frames 110 of the video 108. The image processing module 104 also performs a candidate frame determination 410 on the frames 110 to determine candidate frames 418 that are retained in a candidate frame store 412. The relevant entity store 406 and the candidate frame store 412 are accessed to implement a frame ranking 414, which results in ranked frames 420. The candidate frames 418 can be ranked in order of relative saliency to produce the ranked frames 420. The image processing module 104 performs a salient frame selection 416 based on the ranked frames 420 to produce the salient frames 136. For example, a threshold number of most salient frames can be selected from the ranked frames 420, or those ranked frames 420 having some minimum level of saliency can be selected as the salient frames 136.

Figure 5:
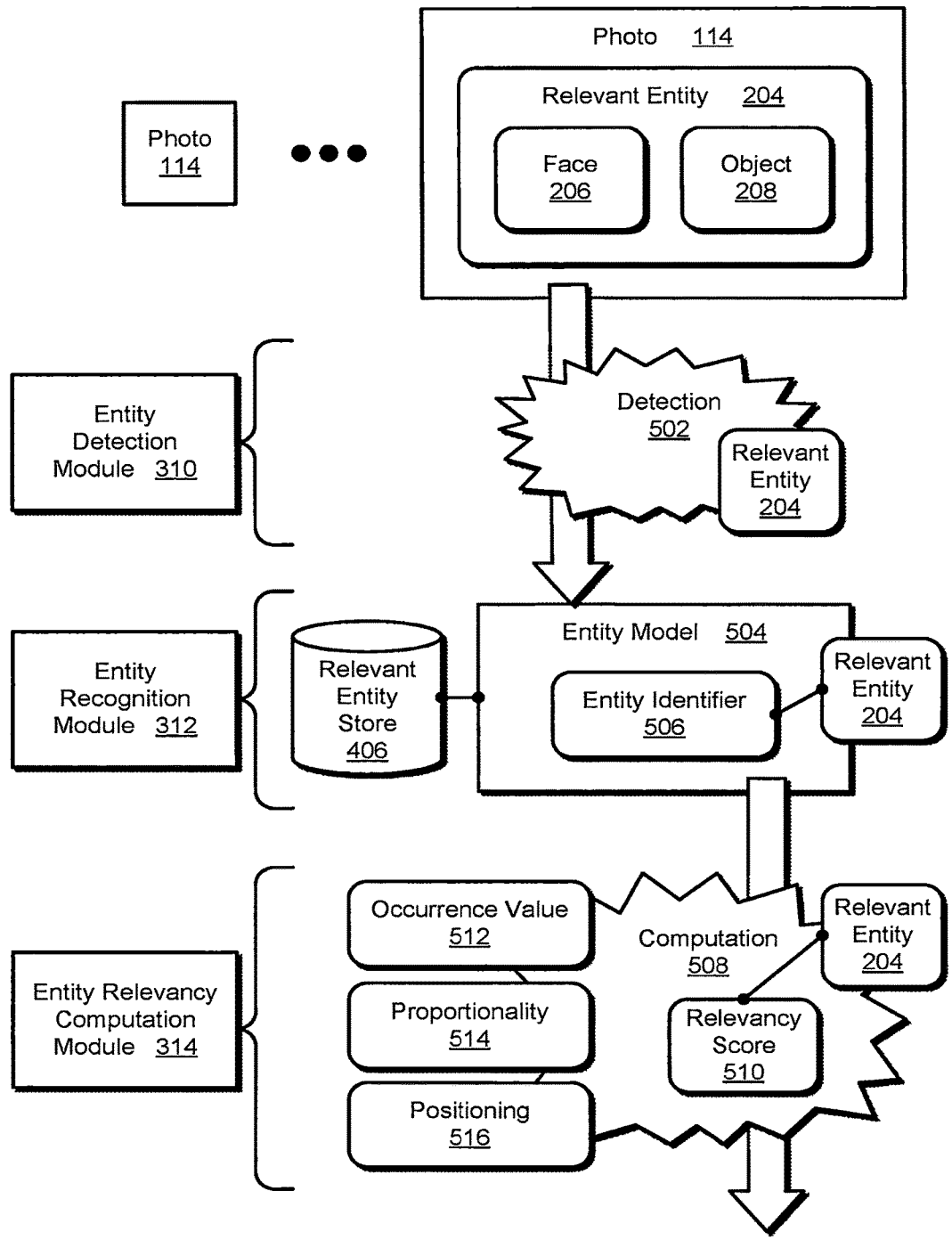
FIG. 5 illustrates an example scheme for ascertaining relevant entities from multiple photos.

FIG. 5 illustrates an example scheme 500 for ascertaining relevant entities 204 from multiple photos 114. The relevant entity ascertainment module 302 (of FIG. 3) implements the scheme 500. The relevant entity ascertainment module 302 includes an entity detection module 310, an entity recognition module 312, and an entity relevancy computation module 314. In an example operation, the entity detection module 310 performs a detection 502 on a photo 114 to detect at least one relevant entity 204. The entity recognition module 312 recognizes relevant entities by assigning an entity identifier 506 to visual characteristics of the detected relevant entity 204. The entity identifier 506 may comprise a uniquely-valued identifier, an identifier derived from features of the visual characteristics, some combination thereof, and so forth.

The detection and recognition can be implemented separately or jointly. Also, the detection or recognition can be realized with individual mechanisms for faces and objects or a combined mechanism for both faces and objects. By way of example, the following techniques can be used for detection or recognition of faces or objects. For facial entities, a Fisher Linear Discriminant-based technique is employed to recognize faces. For object entities, an auto-cutout approach is used to detect objects. Object recognition is accomplished using a technique that depends on a scale invariant feature transform (SIFT) for detected objects. Nevertheless, other technology can be used for detection or recognition of faces or objects.

In example embodiments, the entity recognition is accomplished using at least one entity model 504. Here, separate models are used for faces and for objects. To recognize entities, the following operations are performed. First, a face recognizer is initialized to be an empty face model. Second, an object recognizer is initialized to be an empty object model. Third, faces are detected in a photo. Upon a successful facial detection, the detected faces are input to the face recognizer to update the face model. Fourth, object detection is applied to the photo. Upon a successful object detection, the detected objects are input to the object recognizer to update the object model.

Each recognized face or object is associated with an entity identifier 506 for subsequent use with entities recognized in frames of a video being analyzed. The third and fourth operations are repeated for each photo having a nexus with the video being analyzed. During the repetition of the third and fourth operations, a count for each recurring entity—face or object—is maintained based on recognizer output. These counts can serve as an occurrence value 512, which is described below. The counts can represent one factor indicative of the relevancy, or importance, of a recurring entity. In a fifth operation, the recognized entities can be pruned based on the count totals to eliminate from consideration those entities having a lesser relevancy. For instance, entities with less than three counts or those entities in the bottom half of the count totals can be pruned.

The entity relevancy computation module 314 performs a computation 508 for each relevant entity 204. The resulting relevancy score 510 is associated with a recognized relevant entity 204 from the entity model 504. The computation is based on one or more factors. Example factors include an occurrence value 512, a proportionality 514, a positioning 516, and combinations thereof. The factors can be weighted, scaled, or combined in any manner using one or more mathematical operations. For instance, the occurrence value 512, the proportionality 514, and the positioning 516 can be weighted 50%, 25%, and 25%, respectively, and combined with a multiplication operation.

The occurrence value 512 represents a number of times that the associated relevant entity 204 is present across the multiple photos 114. The occurrence value 512 can be realized using the count mechanism described above with reference to example approaches for implementing the entity model 504. Higher occurrence values 512 indicate greater relevancy. The proportionality factor 514 represents how much area a relevant entity 204 occupies within a single photo 114 or across multiple photos 114. A larger percentage of area indicates a greater relevancy. The positioning factor 516 represents where in a photo 114 a relevant entity 204 is present. Being in a central position indicates a greater relevancy. Other factors for the computation 508 include an extent to which a relevant entity 204 is in-focus, a degree to which a relevant entity 204 that is a person or a face thereof is directly facing the camera, and so forth.

Figure 6:
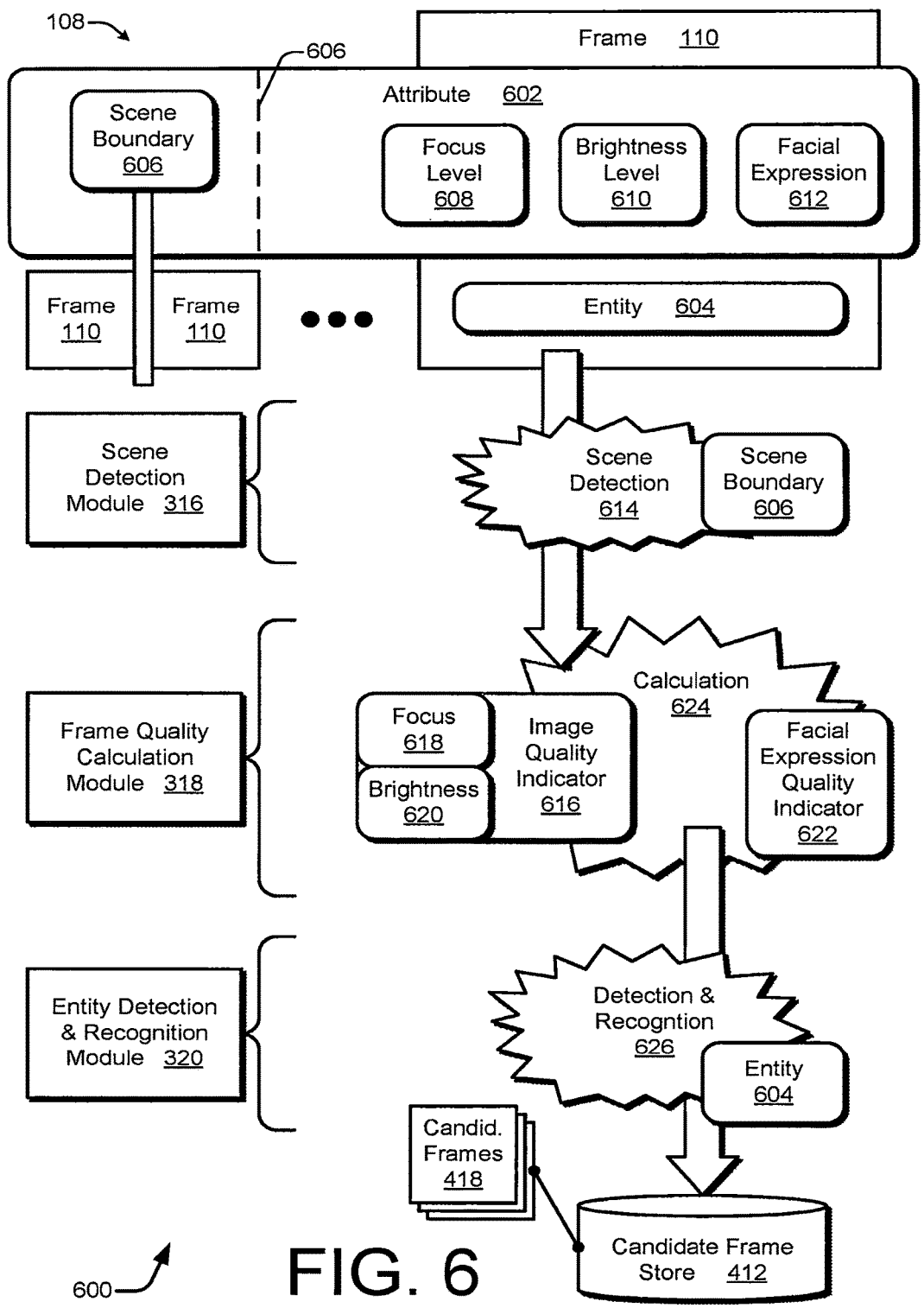
FIG. 6 illustrates an example scheme for determining candidate frames from frames of a video.

FIG. 6 illustrates an example scheme 600 for determining candidate frames 418 from frames 110 of a video 108. The candidate frame determination module 304 (of FIG. 3) implements the scheme 600. The candidate frame determination module 304 includes a scene detection module 316, a frame quality calculation module 318, and an entity detection and recognition module 320. The video 108 includes or is associated with one or more attributes 602. Examples of attributes 602 include video-level attributes 602 such as a scene boundary 606 and frame-level attributes 602 such as a focus level 608, a brightness level 610, and a facial expression characterization 612.

The video 108 includes multiple scenes (not explicitly shown) that are separated by scene boundaries 606, which are located between adjacent frames 110. One or more entities 604 may appear in each frame 110. Each frame 110 has an associated quality in terms of focus, brightness, contrast, facial expression, combinations thereof, and so forth.

In an example operation, the scene detection module 316 performs a scene detection 614 to detect the scenes of the video 108 as indicated by the scene boundaries 606. A scene, as used herein, refers to a collection of consecutive frames 110 that film or are directed to the same subject matter (e.g., one or more objects or persons) from slightly varying angles. To detect scene boundaries 606, the scene detection module 316 analyzes a histogram difference between two frames 110, such as between two consecutive frames 110. If the histogram difference exceeds a difference threshold, the separation between frames is marked as a scene boundary 606. Based on the scene boundaries 606, the starting and ending frame of each scene can be identified. Frame filtering for the determination of candidate frames 418 (or for the ascertainment of salient frames 136 of FIG. 7) can be weighted such that at least one frame 110 is selected from each scene to ensure a good coverage is available for representing the event memorialized by the video 108.

The frame quality calculation module 318 performs a quality calculation 624 on each frame 110 to obtain at least one quality indicator for each frame 110. Examples of quality indicators include an image quality indicator 616, a facial expression quality indicator 622, and combinations thereof Examples for the image quality indicator 616 include a focus quality indicator 618, a brightness quality indicator 620, a contrast quality indicator (not shown), and combinations thereof.

To calculate the focus quality indicator 618, the frame quality calculation module 318 calculates a standard deviation of frame intensities. A frame 110 can be marked as being sufficiently crisp or focused to be a candidate frame 418 if the focus quality indicator 618 comports with (e.g., meets, exceeds, or is less than or equal to) a focus threshold. The focus threshold can be set at an absolute level or at relative level (e.g., those frames 110 having the top one-fourth of focus level are marked as being sufficiently focused). To calculate the brightness quality indicator 620, the frame quality calculation module 318 calculates an average (e.g., mean) intensity of a frame 110. A frame 110 can be marked as being sufficiently bright to be a candidate frame 418 if the brightness quality indicator 620 comports with a brightness threshold. The brightness threshold can be set at an absolute level or at relative level (e.g., the brightest one-third of the frames 110 are marked as being sufficiently bright).

To calculate a facial expression quality indicator 622, the frame quality calculation module 318 calculates an indication that categorizes the faces detected in the frame. The frame quality calculation module 318 can use, for instance, landmark detection to categorize the expressions on the detected faces. If the categorized expression matches with one of a predetermined set of desirable expressions (e.g., happy based on smiling or laughing), the frame 110 having the desirable expression is giving a higher facial expression quality indicator 622. For example, any frame 110 having at least one face with a desirable expression can be assigned a one instead of a zero. Alternatively, a scale can be utilized in which some expressions are valued more highly than others or in which the number of desirable expressions appearing in a given frame is also reflected in the facial expression quality indicator 622. A frame 110 can be marked as being sufficiently expression-friendly to be a candidate frame 418 if the facial expression quality indicator 622 comports with a facial expression threshold. The facial expression threshold can be set at an absolute level (e.g., equal or greater than one) or at relative level (e.g., the top 50% of frames).

The entity detection and recognition module 320 performs a detection and recognition operation 626 on each frame 110 of the video 108 in an attempt to detect and recognize one or more entities 604. The entity detection and recognition module 320 can utilize the same techniques as the entity detection module 310 or the entity recognition module 312 (both of FIGS. 3 and 5). Alternatively, different detection and recognition techniques can be employed. The entity detection and recognition module 320 compares the recognized entities 604 from each frame 110 with the recognized relevant entities 204 from the photos 114 as saved in the relevant entity store 406 (of FIGS. 4 and 5). If a match is discovered, the entity identifier 506 that is associated with the relevant entity 204 is also associated with the frame 110 having the matching entity 604. Alternatively, the matching and the associating can be performed by the salient frame establishment module 306, which is described with reference to FIG. 7. Based on the scene boundaries 606, the per-frame quality indicators 616 or 622, the recognized entities 604, some combination thereof, and so forth, the candidate frame determination module 304 promotes a number or a percentage of the total frames 110 of the video 108 to be the candidate frames 418. These candidate frames 418 are retained in the candidate frame store 412.

Figure 7:
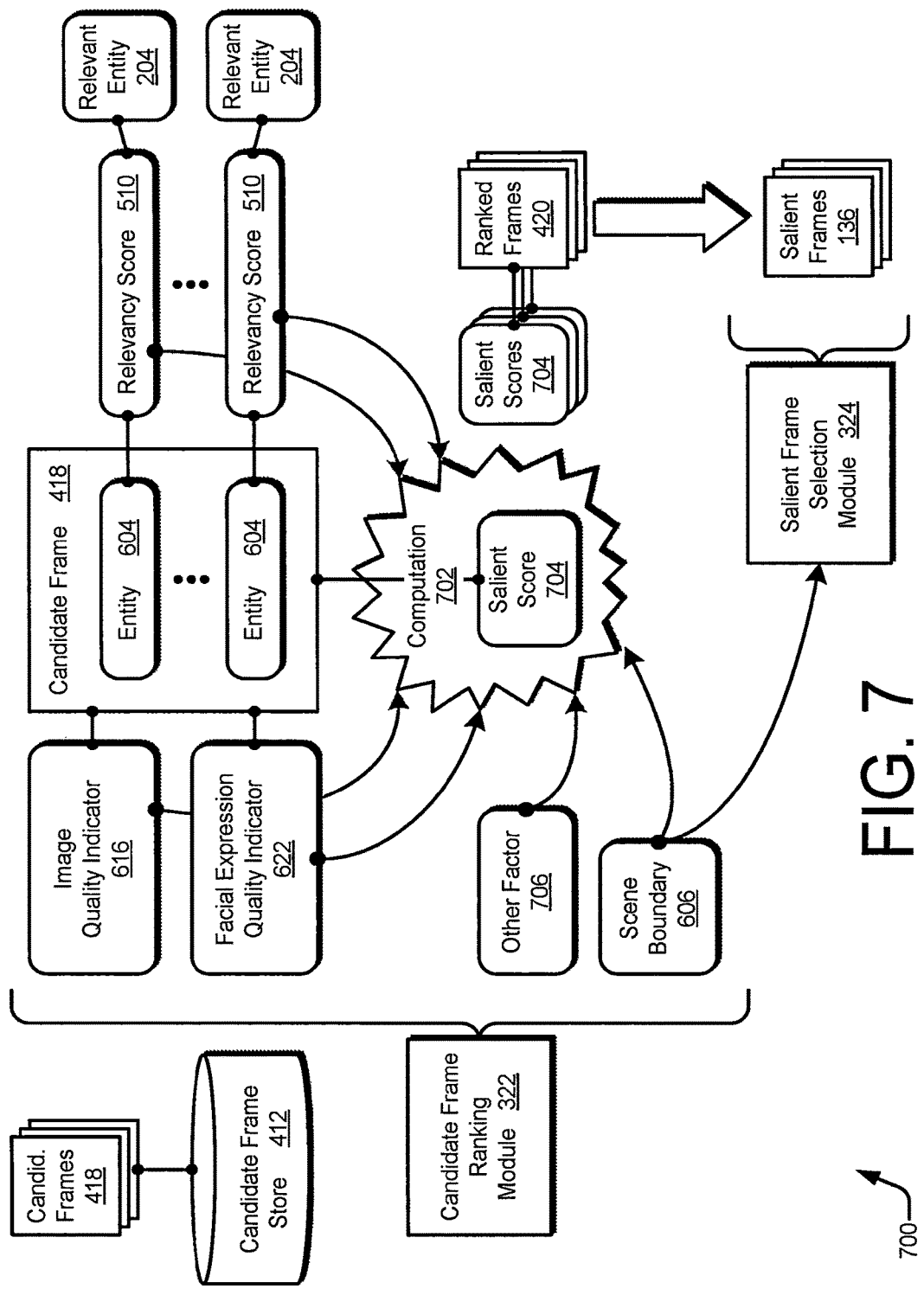
FIG. 7 illustrates an example scheme for establishing salient frames from the determined candidate frames based on the ascertained relevant entities.

FIG. 7 illustrates an example scheme 700 for establishing salient frames 136 from the determined candidate frames 418 based on the ascertained relevant entities 204. The salient frame establishment module 306 (of FIG. 3) implements the scheme 700. The salient frame establishment module 306 includes a candidate frame ranking module 322 and a salient frame selection module 324. The candidate frame ranking module 322 ranks the candidate frames 418 based on respective salient scores 704 to produce the ranked frames 420. The candidate frame ranking module 322 performs a computation 702 to generate a salient score 704 for each respective candidate frame 418.

A number of different factors are incorporated into the computation 702 to generate the salient score 704. Example factors include at least one relevancy score 510, at least one image quality indicator 616, at least one facial expression quality indicator 622, one or more scene boundaries 606, one or more other factors 706, or a combination thereof. Each entity 604 that is recognized as appearing in a given candidate frame 418 is compared to those relevant entities 204 that are recognized as being present in one or more photos 114. If a match is discovered, the relevancy score 510 that is associated with the relevant entity 204 is included in the computation 702 for the salient score 704. Multiple such recognized entities 604 can result in multiple relevancy scores 510 being incorporated into the computation 702.

The candidate frame ranking module 322 can directly incorporate the image quality indicator 616, the facial expression quality indicator 622, or the scene boundary 606 into the computation 702 of the salient score 704. Additionally or alternatively, one or more of these factors can be indirectly incorporated into the computation 702 as part of the determination that promotes a frame 110 to be a candidate frame 418, as described above with reference to FIG. 6. Other factors 706 can include a previous manual selection of an entity 604 by an end user, whether an entity 604 matches a relevant entity 204 that is present in a photo 114 that was taken during the actual filming of the video 108, a length of time during which (or a number of frames 110 or 418 in which) an entity 604 appears, combinations thereof, and so forth.

An example equation for performing the computation 702 to generate a salient score 704 for a given candidate frame 418 is as follows:

$$\text{Salient\_Score} = \text{Image\_Q} * \text{Facial\_Expression\_Q} * (\text{Relev\_}S_a + \ldots + \text{Relev\_}S_e).$$

In this example equation, the Salient_Score variable corresponds to the salient score 704, and the Image_Q variable corresponds to the image quality indicator 616. Thus, the Image_Q variable can incorporate the focus quality indicator 618, the brightness quality indicator 620, and so forth. The Facial_Expression_Q variable corresponds to the facial expression quality indicator 622. Each Relev_S variable corresponds to a relevancy score 510 associated with different relevant entities 204 that appear in a given candidate frame 418 (as entities 604) with different entities identified by the subscripts a to e, with e representing some integer. Although multiplication is employed in the example equation above and the term factor is used herein, the computation 702 can be implemented using one or more additional or alternative mathematical operations.

The salient frame selection module 324 selects the salient frames 136 from the ranked frames 420 based on the respective salient scores 704 of the ranked frames 420. For example, the salient frame selection module 324 can select the top m frames of the ranked frames 420, with the variable m representing an integer (e.g., 30 or 50), a percentage (e.g., 10% or 25%), or a combination thereof (e.g., 10% with a minimum of 10 and a maximum of 100 frames). Alternatively, the salient frame selection module 324 can select a minimum number of total frames for each five seconds of video length. This selection filtering operation may also be performed responsive to the scene boundaries 606. For instance, the salient frame selection module 324 can ensure that at least one frame per scene is selected as a salient frame 136. Also, a minimum number of frames within each span of time can be implemented (e.g., at least five frames are extracted as being salient per three-second video period).

Figure 8:
FIGS. 8 and 9 jointly depict an example implementation scenario in which salient frames are established from an example image library so as to facilitate creation of a static collage.
Figure 9:
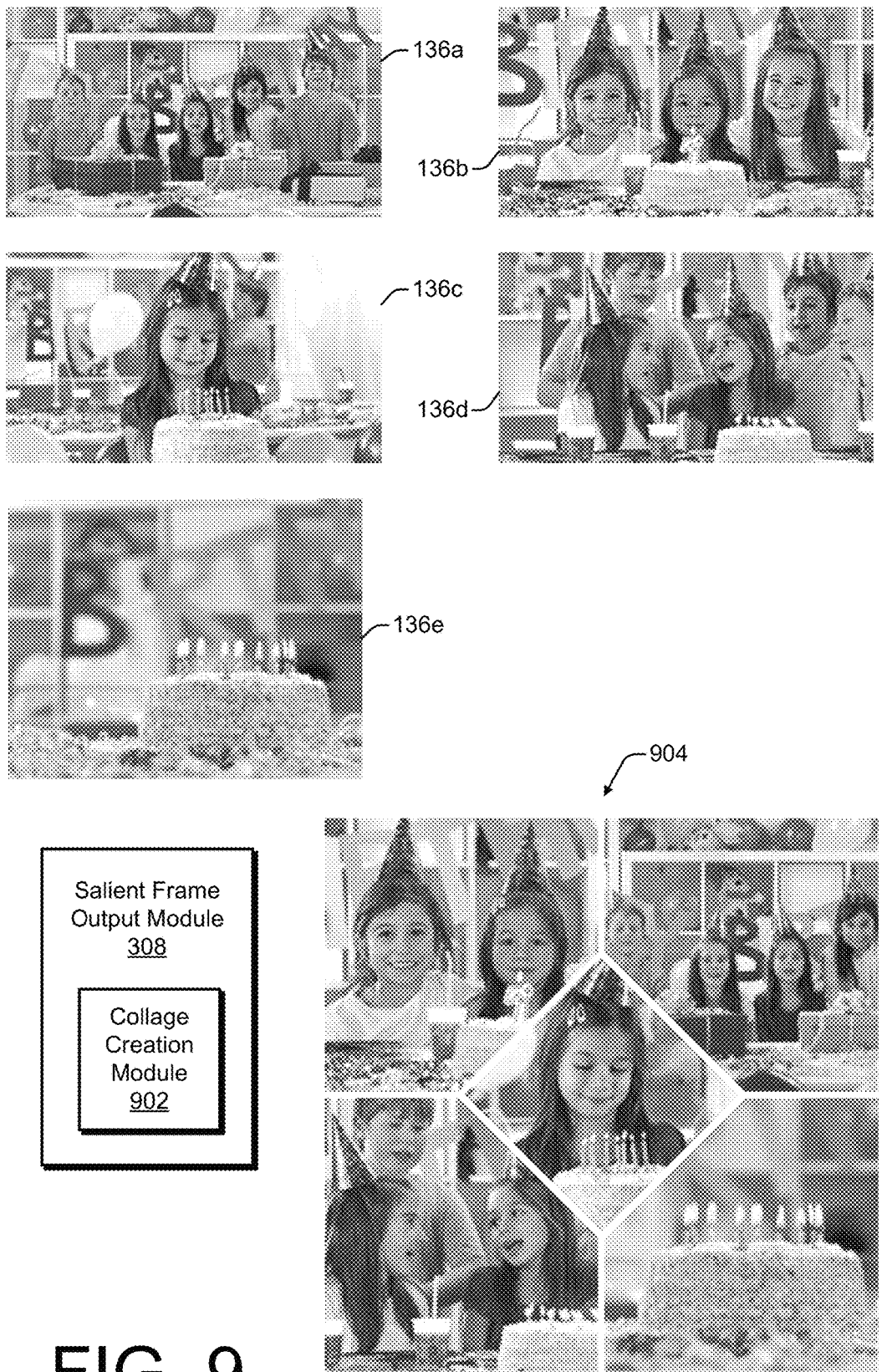

FIGS. 8 and 9 jointly depict an example implementation scenario in which salient frames 136 are established from an example image library 402 so as to facilitate creation of a static collage 904. In the illustrated example scenario, a birthday party event has been memorialized with multiple videos 108 and multiple photos 114, a few of which are explicitly indicated by reference number. The sample image library 402 is depicted, by way of example only, via a screen shot of a gallery of images from an iPhone® running a version of iOS®, both of which are produced by Apple® Corporation of Cupertino, Calif. To produce the image library 402 having the illustrated state, an end user has taken various photos 114 and has recorded different videos 108, each of which is intended to capture some happening (e.g., the blowing out of candles) that is part of the overall event. In this example scenario, the end user wishes to create a collage representative of the event using still images, which is termed a static collage herein. Moreover, the end user desires to use at least some of the frames of at least one of the two videos 108. As shown in FIG. 9, the example salient frame output module 308 incudes a collage creation module 902 that can create the static collage 904.

Because each of the two videos 108 runs 10 seconds at 30 frames per second, each video 108 is decoded into 300 frames 110 (e.g., of FIGS. 1, 2A, 6, and 7). To save the end user time while still presenting the frames 110 that the end user is likely to want to include in a static collage, the image processing module 104 operates on the 300 frames 110. After the relevant entity ascertainment module 302, the candidate frame determination module 304, and the salient frame establishment module 306 execute, multiple salient frames 136 are established, such as two dozen salient frames. The salient frame output module 308 presents the multiple salient frames 136 to the end user for review and consideration for inclusion in the static collage 904.

As shown in FIG. 9, the salient frame output module 308 accepts user input that designates particular ones of the multiple salient frames 136 for inclusion in the static collage. Specifically, the end user has designated the five salient frames 136a, 136b, 136c, 136d, and 136e for inclusion in the static collage 904. The collage creation module 902 of the salient frame output module 308 creates the static collage 904 using the five designated salient frames 136a, 136b, 136c, 136d, and 136e. In this example scenario, the person or face in the salient frame 136c is featured the most in the image library 402 (e.g., has the highest number of occurrences across the multiple photos 114). Consequently, the image processing module 104 deems the face of the salient frame 136c to have the highest priority from the perspective of the user that operated the smart phone during the event, and the collage creation module 902 therefore places the salient frame 136c in the center of the static collage 904.

Having discussed example details of systems, techniques, and schemes for salient video frame establishment, consider now some example procedures to illustrate additional aspects of the techniques.

Example Procedures

Figure 10:
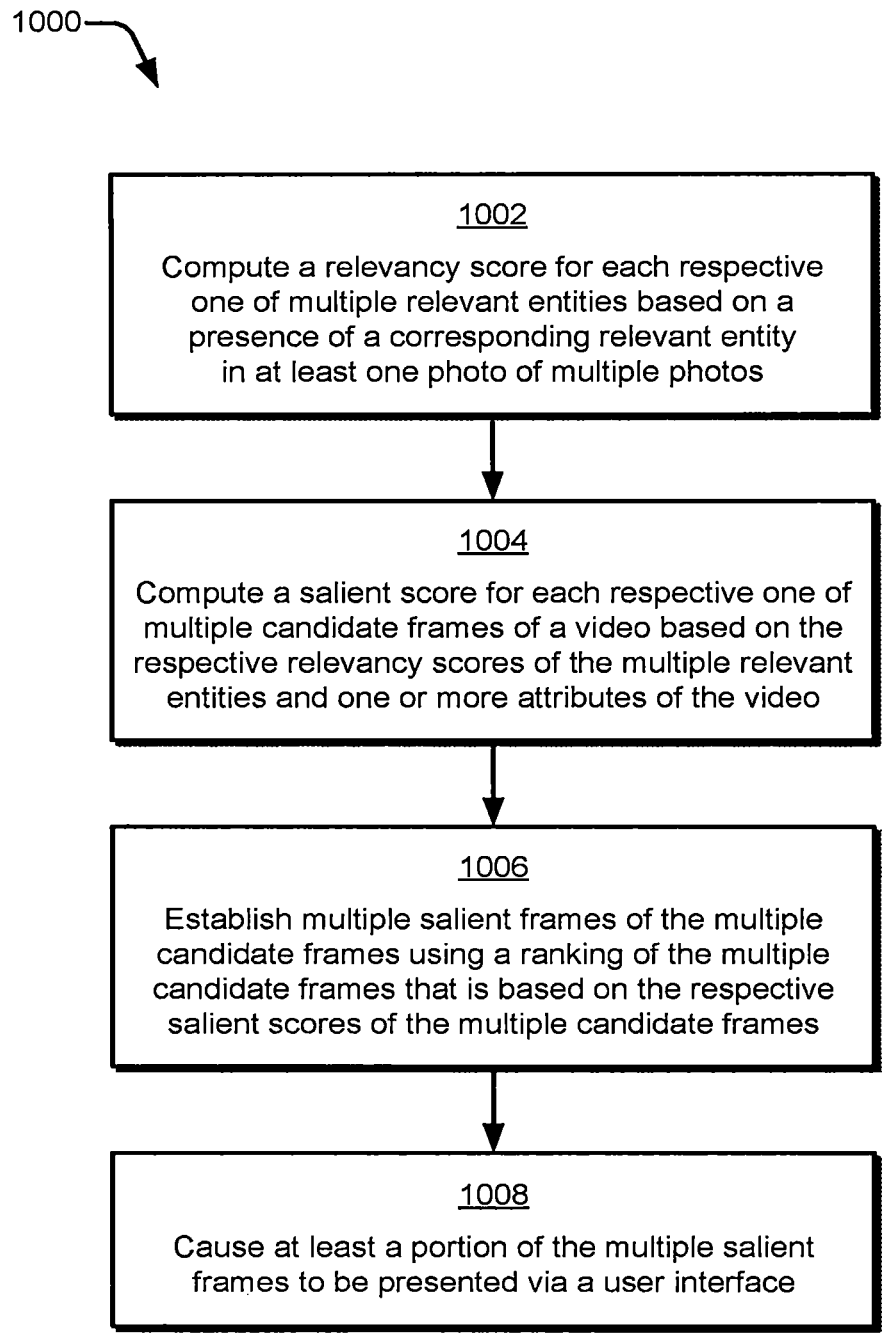
FIG. 10 is a flow diagram illustrating an example procedure in accordance with one or more example embodiments.
Figure 11:
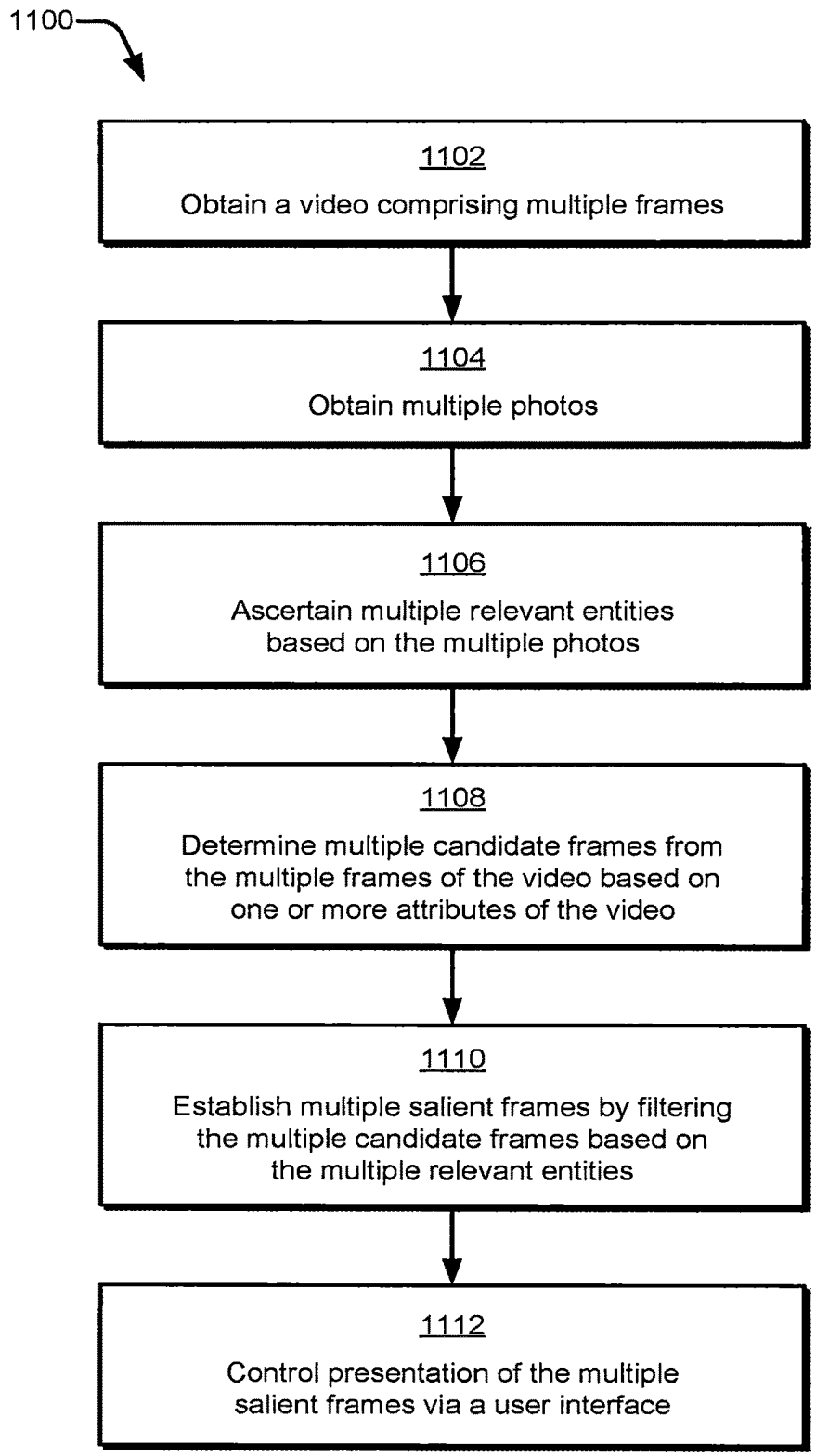
FIG. 11 is another flow diagram illustrating another example procedure in accordance with one or more example embodiments.

This section describes with reference to FIGS. 10 and 11 example procedures relating to salient video frame establishment in one or more embodiments. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102 (of FIG. 1) or 1202 (of FIG. 12) using an image processing module 104 (e.g., of FIGS. 1, 2A, 4, and 12).

FIG. 10 is a flow diagram that includes four blocks 1002-1008 and that illustrates an example procedure 1000 for salient video frame establishment in accordance with one or more example embodiments. At block 1002, a relevancy score is computed for each respective one of multiple relevant entities based on a presence of a corresponding relevant entity in at least one photo of multiple photos. For example, a computing device 102 can compute a relevancy score 510 for each respective one of multiple relevant entities 204 based on a presence of a corresponding relevant entity 204 in at least one photo 114 of multiple photos 114. For instance, a relevant entity ascertainment module 302 may compute the relevancy score 510 for the corresponding relevant entity 204 based on an occurrence value 512, an area coverage proportionality 514, a spatial positioning 516, a combination thereof, and so forth.

At block 1004, a salient score is computed for each respective one of multiple candidate frames of a video based on the respective relevancy scores of the multiple relevant entities and one or more attributes of the video. For example, the computing device 102 can compute a salient score 704 for each respective one of multiple candidate frames 418 of a video 108 based on the respective relevancy scores 510 of the multiple relevant entities 204 and one or more attributes 602 of the video 108. To do so, a salient frame establishment module 306, in conjunction with a candidate frame determination module 304, may compute the salient score 704 for a respective corresponding candidate frame 418 based on one or more relevancy scores 510 associated with entities appearing in the corresponding candidate frame 418, at least one image quality indicator 616 for the candidate frame 418, at least one facial expression quality indicator 622 for the candidate frame 418, and so forth.

At block 1006, multiple salient frames of the multiple candidate frames are established using a ranking of the multiple candidate frames that is based on the respective salient scores of the multiple candidate frames. For example, the computing device 102 can establish multiple salient frames 136 of the multiple candidate frames 418 using a ranking (e.g., which is realized as multiple ranked frames 420) of the multiple candidate frames 418 with the ranking being based on the respective salient scores 704 of the multiple candidate frames 418. From the ranked frames 420, the salient frame establishment module 306 may filter out the bottom e.g. 95% of the candidate frames 418 to select the salient frames 136.

At block 1008, at least a portion of the multiple salient frames are caused to be presented via a user interface. For example, the computing device 102 can cause at least a portion of the multiple salient frames 136 to be presented via a user interface 134. With a cloud-based implementation, a remote server may instruct a browser or web app to display the selected salient frames 136 on a display screen.

FIG. 11 is a flow diagram that includes six blocks 1102-1112 and that illustrates an example procedure 1100 for salient video frame establishment in accordance with one or more example embodiments. At block 1102, a video is obtained that includes multiple frames. For example, a computing device 102 can obtain a video 108 including multiple frames 110. With an end-user device implementation, an image processing module 104 may access a local memory to ready out video files. At block 1104, multiple photos are obtained. For example, the computing device 102 can obtain multiple photos 114. To do so, the image processing module 104 may communicate with an operating system to retrieve photos 114 included in an image library 402 that is stored in flash memory.

At block 1106, multiple relevant entities are ascertained based on the multiple photos. For example, the computing device 102 can ascertain multiple relevant entities 204 based on the multiple photos 114. For instance, the image processing module 104 may ascertain relevant entities 204 based on whether, or how many times, each relevant entity 204 is present in the obtained photos 114.

At block 1108, multiple candidate frames are determined from the multiple frames of the video based on one or more attributes of the video. For example, the computing device 102 can determine multiple candidate frames 418 from the multiple frames 110 of the video 108 based on one or more attributes 602 of the video 108. The image processing module 104 may determine the candidate frames 418 based on one or more scene boundaries 606 and at least one per-frame indicator for image quality 616 or facial expression quality 622.

At block 1110, multiple salient frames are established by filtering the multiple candidate frames based on the multiple relevant entities. For example, the computing device 102 can establish multiple salient frames 136 by filtering the multiple candidate frames 418 based on the multiple relevant entities 204. To realize the filtering, the image processing module 104 may implement a selection filter 112 that selects those candidate frames 418 having the ascertained relevant entities 204 that are present more frequently in the photos 114.

At block 1112, presentation of the multiple salient frames is controlled via a user interface. For example, the computing device 102 can control presentation of the multiple salient frames 136 via a user interface 134. To do so, the image processing module 104 causes the user interface 134 to display the salient frames 136 in a grid, in a carousel, in scrollable line, and so forth to enable an end user to select preferred frames 110 for further processing, such as a static collage or an abbreviated video having segments derived from the end-user selections. Alternatively, the image processing module 104 can cause the user interface 134 to display a completed static collage that is created from a subset of the salient frames 136 automatically by the module.

Having described example procedures in accordance with one or more embodiments, consider now an example system and device that can be utilized to implement the various schemes and techniques described herein.

Example System and Device

Figure 12:
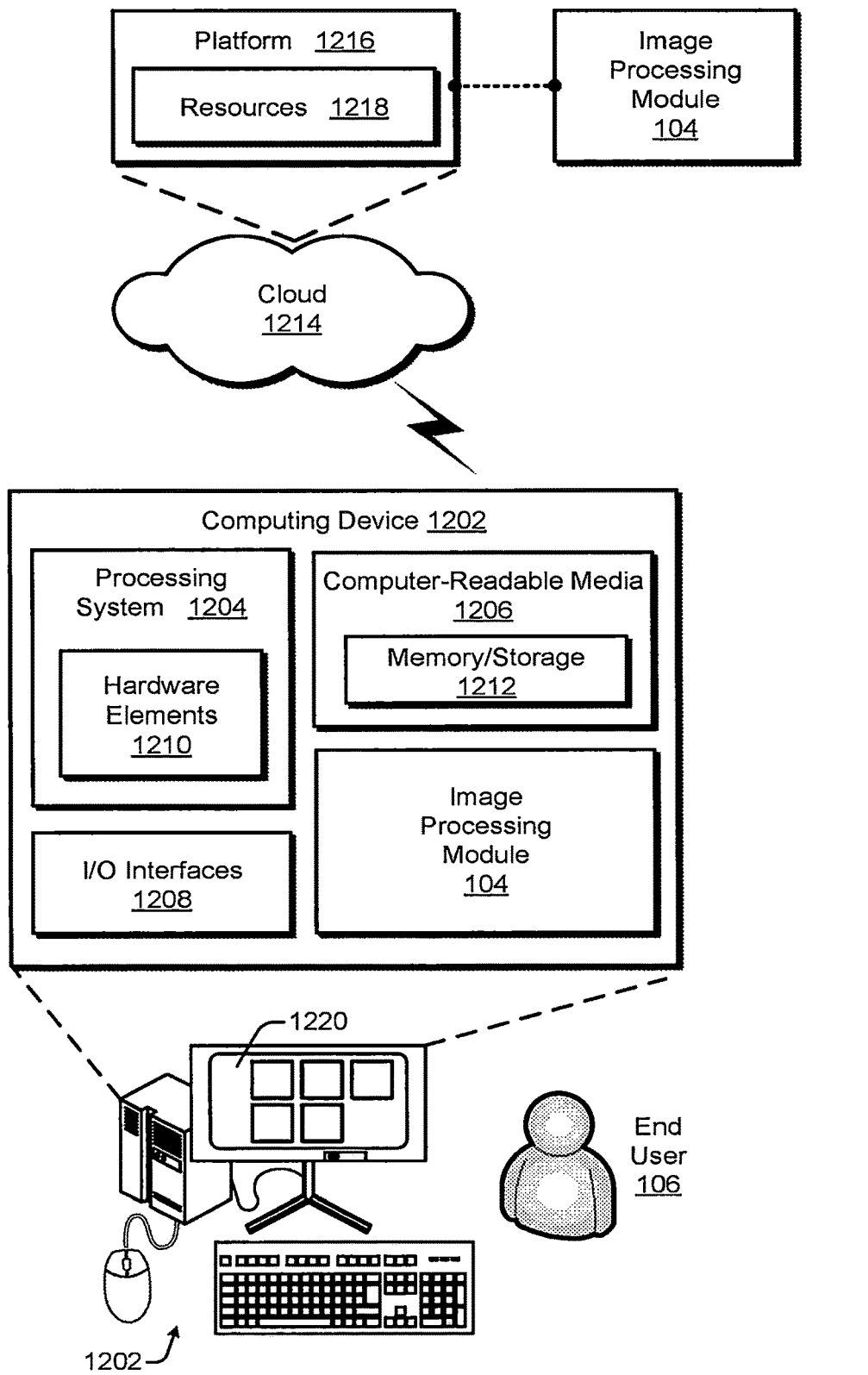
FIG. 12 illustrates an example system including various components of example devices that can be employed for one or more embodiments of salient video frame establishment.

FIG. 12 illustrates generally at 1200 an example system including an example computing device 1202 representative of one or more computing systems or computing devices that may implement the various techniques described herein. This is depicted through the inclusion of an image processing module 104, which may operate as described herein above. A computing device 1202 may be implemented as, for example, a computing device 102 (of FIG. 1) in an independent or standalone mode. The computing device 1202 can display one or more frames to the end user 106 via a display screen 1220. Generally, a computing device 1202 may be implemented as, for example, an end-user device (e.g., a smart phone or desktop computer) of an end user 106, a corporate device (e.g., a server side device or data center hardware) of a business, an on-chip system or system-on-a-chip (SOC) (e.g., that is integrated with a tablet device or an image capture or display device), or any other suitable computing device or computing system.

In an example implementation as shown in FIG. 1, the image processing module 104 is executing at one location (e.g., within a housing of the computing device 102). However, the image processing module 104 can alternatively be executing in the cloud (e.g., on a network-side computing device) if bandwidth is sufficiently large or transmission latency is sufficiently small, and such an example implementation as also shown in FIG. 12. Alternatively, a portion of the image processing module 104 can be executing at both a client-side computing device and a server-side computing device. In such an implementation, the operations implemented by the image processing module 104 as described herein may be distributed across a client-server architecture.

The example computing device 1202 as illustrated includes at least one processing system 1204, one or more computer-readable media 1206, and one or more I/O interfaces 1208 that may be communicatively coupled, one to another. Although not explicitly shown, the computing device 1202 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including one or more hardware elements 1210 that may be implemented as processors, functional blocks, and so forth. This may include implementation in hardware as an application specific integrated circuit (ASIC), a general-purpose processor, or other logic device formed using e.g. one or more semiconductors. The hardware elements 1210 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (e.g., random access memory (RAM)) or nonvolatile media (e.g., read only memory (ROM), flash memory, optical discs, or magnetic disks). The memory/storage component 1212 may include fixed media (e.g., RAM, ROM, or a fixed hard drive) or removable media (e.g., a flash memory card, a removable hard drive, or an optical disc). The computer-readable media 1206 may be implemented in a variety of other ways as further described below.

The input/output interface(s) 1208 are representative of functionality to allow a user to enter commands or information to computing device 1202 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof Thus, the computing device 1202 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1206 may include a variety of media that may be accessed by the computing device 1202. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1202, such as via a network. Computer-readable signal media may typically embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct-wired connection, or wireless media, such as acoustic, RF, microwave, infrared, or other wireless media.

As previously described, hardware elements 1210 or computer-readable media 1206 may be representative of modules, programmable device logic, fixed device logic, a combination thereof, and so forth that are implemented in a hardware form that may be employed in some embodiments to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1210. The computing device 1202 may be configured to implement particular instructions or functions corresponding to software or hardware modules. Accordingly, implementation of a module that is executable by the computing device 1202 as software may be achieved at least partially in hardware, e.g., through use of computer-readable storage media or the hardware elements 1210 of the processing system 1204. The instructions or functions may be executable/operable by one or more articles of manufacture (e.g., one or more computing devices 1202 or processing systems 1204) to implement techniques, modules, or examples described herein.

The techniques described herein may be supported by various configurations of the computing device 1202 and are not limited to the specific aspects of the example devices described herein. This functionality may also be implemented fully or partially through use of a distributed system, such as over a "cloud" 1214 via a platform 1216 as described below.

The cloud 1214 may include or represent a platform 1216 for resources 1218. The platform 1216 abstracts underlying functionality of hardware (e.g., one or more servers or at least one data center) and software resources of the cloud 1214. The resources 1218 may include applications or data that can be utilized while computer processing is at least partially executed on servers remote from, or distributed around, the computing device 1202. Resources 1218 may also include services provided over the Internet or through a subscriber network, such as a cellular or Wi-Fi network.

The platform 1216 may abstract resources and functions to connect the computing device 1202 with other computing devices or services. The platform 1216 may also serve to abstract a scaling of resources to provide a corresponding level of scale to encountered demand for the resources 1218 implemented via the platform 1216. Accordingly, in an interconnected device embodiment, implementation of functionality described herein may be distributed throughout the illustrated system of FIG. 12, or at least throughout the cloud 1214 along with the computing device 1202. For example, functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to extract multiple salient frames from a video based at least partially on entities present in one or more photos, a method implemented by at least one computing device, the method comprising:
    obtaining, by the at least one computing device, a video including multiple frames;
    obtaining, by the at least one computing device, multiple photos which are extrinsic to the video;
    ascertaining, by the at least one computing device, multiple relevant entities in the video based on the multiple photos extrinsic to the video;
    determining, by the at least one computing device, multiple candidate frames from the multiple frames of the video;
    establishing, by the at least one computing device, multiple salient frames, in part, by:
        filtering the multiple candidate frames based on the multiple relevant entities based on the multiple photos which are extrinsic to the video, and
        computing multiple salient scores for the multiple candidate frames, each respective salient score corresponding to a respective candidate frame, each respective salient score is based on an image quality indicator of the each of the respective candidate frame and a relevancy score computed for at least one entity appearing in the respective candidate frame; and
    controlling, by the at least one computing device, presentation of the multiple salient frames via a user interface.

2. The method as described in claim 1, wherein the obtaining of the multiple photos comprises retrieving the multiple photos from an image library based on a time associated with the video and a temporal threshold.

3. The method as described in claim 1, wherein the image quality indicator comprises at least one of a frame focus level or a frame brightness level.

4. The method as described in claim 1, wherein the ascertaining comprises:
    detecting a relevant entity in at least one photo of the multiple photos;
    recognizing the detected relevant entity; and
    assigning an entity identifier to the recognized relevant entity.

5. The method as described in claim 4, wherein:
    the ascertaining further comprises:
        determining an occurrence value for the recognized relevant entity across the multiple photos; and
        associating the occurrence value with the entity identifier; and
    the establishing further comprises establishing the multiple salient frames based on the occurrence value associated with the entity identifier.

6. The method as described in claim 1, wherein the multiple relevant entities comprise at least one of relevant faces or relevant objects.

7. The method as described in claim 1, wherein:
    the ascertaining comprises computing a relevancy score for each relevant entity of the multiple relevant entities based on the multiple photos; and
    the establishing further comprises:
        ranking the multiple candidate frames based on the multiple salient scores, and
        selecting the multiple salient frames based on the ranking of the multiple candidate frames.

8. The method as described in claim 1, wherein:
    the establishing further comprises ranking the multiple salient frames; and
    the controlling further comprises causing the multiple salient frames to be displayed based on the ranking of the multiple salient frames.

9. At least one computing device operative in a digital medium environment to extract frames from a video based at least partially on entities present in one or more photos, the at least one computing device comprising:
    a processing system and at least one computer-readable storage medium including:
        a relevant entity ascertainment module configured to ascertain multiple relevant entities based on multiple photos, wherein the multiple photos are extrinsic to the video;
        a candidate frame determination module configured to determine multiple candidate frames from multiple frames of the video;
        a salient frame establishment module configured to establish multiple salient frames, at least in part, by:
            filtering the multiple candidate frames based on the multiple relevant entities, and
            computing multiple salient scores for the multiple candidate frames, each respective salient score corresponding to a respective candidate frame, each respective salient score is based on an image quality indicator of the respective candidate frame and a relevancy score computed for at least one entity appearing in the respective candidate frame; and
        a salient frame output module configured to control presentation of the multiple salient frames via a user interface.

10. The at least one computing device described in claim 9, wherein the relevant entity ascertainment module is configured to compute the relevancy score for each respective corresponding relevant entity of the multiple relevant entities.

11. The at least one computing device as described in claim 10, wherein the relevant entity ascertainment module is configured to compute each relevancy score based on an occurrence value that depends on a number of occurrences of the respective corresponding relevant entity across the multiple photos.

12. The at least one computing device as described in claim 9, wherein the salient frame output module includes a collage creation module configured to create a static collage using at least a portion of the multiple salient frames.

13. The at least one computing device as described in claim 12, wherein the collage creation module is configured to create the static collage using at least the portion of the multiple salient frames responsive to user input directed to a presentation of the multiple salient frames.

14. At least one computing device operative in a digital medium environment to extract frames from a video based at least partially on entities present in one or more photos, the at least one computing device including hardware components comprising a processing system, one or more computer-readable storage media storing computer-readable instructions that are executable by the processing system to perform operations comprising:
  computing a relevancy score for each respective one of multiple relevant entities based on a presence of a corresponding relevant entity in at least one photo of multiple photos, wherein the multiple photos are extrinsic to the video;
  computing a salient score for each respective one of multiple candidate frames from multiple frames of a video, each respective salient score corresponding to a respective candidate frame, each respective salient score is based on an image quality indicator of the respective candidate frame and incorporating the respective relevancy score responsive to an appearance of the corresponding relevant entity in the respective candidate frame;
  establishing multiple salient frames of the multiple candidate frames using a ranking of the multiple candidate frames that is based on the respective salient scores of the multiple candidate frames; and
  causing at least a portion of the multiple salient frames to be presented via a user interface.

15. The at least one computing device as described in claim 14, wherein:
  the one or more attributes of the video comprise at least one of a per-frame focus level indicator, a per-frame brightness level indicator, or a length of time a recognized entity appears in the video; and
  the presence of the corresponding relevant entity comprises at least one of a number of occurrences across the multiple photos, a proportional spatial coverage over at least one photo of the multiple photos, or a positional presence in at least one photo of the multiple photos.

16. The method as described in claim 1, wherein at least one of the multiple scenes includes consecutive frames, each of which displays an object such that the displayed object appears at an angle in one of the consecutive frames and another angle in at least another one of the consecutive frames.

17. The at least one computing device as described in claim 9, wherein at least one of the multiple scenes includes consecutive frames, each of which displays an object such that the displayed object appears at an angle in one of the consecutive frames and another angle in at least another one of the consecutive frames.

18. The at least one computing device as described in claim 9, wherein the relevant entity ascertaining module ascertains multiple relevant entities by:
  detecting a relevant entity in at least one photo of the multiple photos;
  recognizing the detected relevant entity; and
  assigning an entity identifier to the recognized relevant entity.

19. The method as described in claim 18, further comprising:
  determining an occurrence value for the recognized relevant entity across the multiple photos; and
  associating the occurrence value with the entity identifier.

20. The at least one computing device as described in claim 14, wherein the multiple relevant entities comprise at least one of relevant faces or relevant objects.

* * * * *